US009489743B2

(12) United States Patent
Spector et al.

(10) Patent No.: US 9,489,743 B2
(45) Date of Patent: Nov. 8, 2016

(54) DETERMINING DIMENSION OF TARGET OBJECT IN AN IMAGE USING REFERENCE OBJECT

(71) Applicant: MeCommerce, Inc., San Francisco, CA (US)

(72) Inventors: David Spector, San Francisco, CA (US); Ara Nefian, San Francisco, CA (US); Prateek V. Joshi, San Francisco, CA (US); Heidi Zak, San Francisco, CA (US); Ra'el Cohen, San Francisco, CA (US)

(73) Assignee: MeCommerce, Inc., San Francisco, CA (US)

( * ) Notice: Subject to any disclaimer, the term of this patent is extended or adjusted under 35 U.S.C. 154(b) by 105 days.

(21) Appl. No.: 14/207,119

(22) Filed: Mar. 12, 2014

(65) Prior Publication Data

US 2014/0270540 A1     Sep. 18, 2014

Related U.S. Application Data

(60) Provisional application No. 61/779,060, filed on Mar. 13, 2013, provisional application No. 61/836,614, filed on Jun. 18, 2013, provisional application No. 61/900,961, filed on Nov. 6, 2013, provisional application No. 61/924,822, filed on Jan. 8, 2014.

(51) Int. Cl.
| | | |
|---|---|---|
| *G06K 9/48* | (2006.01) | |
| *G06T 7/00* | (2006.01) | |
| *G06T 7/60* | (2006.01) | |

(52) U.S. Cl.
CPC ............ *G06T 7/0087* (2013.01); *G06T 7/0032* (2013.01); *G06T 7/0071* (2013.01); *G06T 7/0083* (2013.01); *G06T 7/0093* (2013.01); *G06T 7/60* (2013.01); *G06T 2207/10024* (2013.01); *G06T 2207/20076* (2013.01); *G06T 2207/20144* (2013.01); *G06T 2207/30196* (2013.01); *G06T 2207/30201* (2013.01); *G06T 2207/30204* (2013.01)

(58) Field of Classification Search
CPC . G06T 7/0087; G06T 7/0032; G06T 7/0083; G06T 7/0093; G06T 7/0071; G06T 7/60; G06T 2207/0024; G06T 2207/20076; G06T 2207/30196; G06T 2207/30201; G06T 2207/30204; G06T 2207/20144
USPC .................. 382/106, 115, 162, 164, 173
See application file for complete search history.

(56) References Cited

U.S. PATENT DOCUMENTS

| | | |
|---|---|---|
| 5,548,519 A | 8/1996 | Park |
| 5,768,135 A | 6/1998 | Park |
| 6,353,770 B1 | 3/2002 | Ramsey |
| 6,516,240 B2 | 2/2003 | Ramsey |
| 6,711,455 B1 | 3/2004 | Holloway |

(Continued)

OTHER PUBLICATIONS

Form PCT/ISA/220, PCT/US2014/024910, "Notification of Transmittal of the International Search Report and the Written Opinion of the International Searching Authority, or the Declaration", 1 page; Form PCT/ISA/210, PCT/US2014/024910, "International Search Report ", 3 pages; Form PCT/ISA/237, PCT/US2014/024910, "Written Opinion of the International Searching Authority", 5 pages.

*Primary Examiner* — Samir Ahmed

(57) ABSTRACT

Systems and methods for determining one or more dimensions of an object using a digital image are described.

29 Claims, 24 Drawing Sheets

(56) References Cited

U.S. PATENT DOCUMENTS

| | | | |
|---|---|---|---|
| 6,917,692 B1 * | 7/2005 | Murching | G06K 9/32 348/172 |
| 7,020,538 B2 | 3/2006 | Luhnow | |
| 7,623,938 B2 | 11/2009 | Luhnow | |
| 7,676,081 B2 * | 3/2010 | Blake | G06K 9/00234 358/538 |
| 8,073,318 B2 | 12/2011 | Gindele | |
| 2003/0197806 A1 | 10/2003 | Perry | |
| 2007/0154095 A1 * | 7/2007 | Cao | G06K 9/00234 382/190 |
| 2008/0310716 A1 * | 12/2008 | Jolly | G06K 9/342 382/173 |
| 2010/0067782 A1 * | 3/2010 | Dunn | G06T 7/0081 382/162 |
| 2010/0119147 A1 | 5/2010 | Blake et al. | |
| 2010/0226574 A1 * | 9/2010 | Omori | G06K 9/4647 382/170 |
| 2011/0075926 A1 * | 3/2011 | Piramuthu | G06T 7/0081 382/173 |
| 2011/0212751 A1 | 9/2011 | Havens | |
| 2011/0246329 A1 | 10/2011 | Geisner et al. | |
| 2011/0268359 A1 | 11/2011 | Steinberg et al. | |
| 2011/0293180 A1 | 12/2011 | Criminisi et al. | |
| 2012/0299912 A1 | 11/2012 | Kapur et al. | |
| 2012/0314942 A1 * | 12/2012 | Williams | G06T 19/006 382/164 |
| 2013/0179288 A1 * | 7/2013 | Moses | G06Q 10/00 705/26.1 |

\* cited by examiner

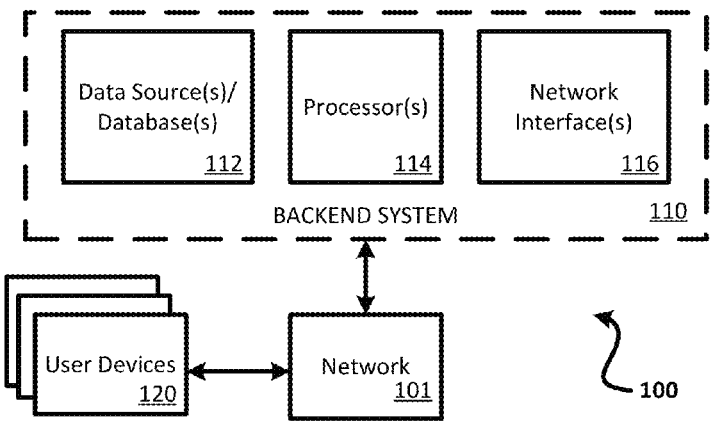
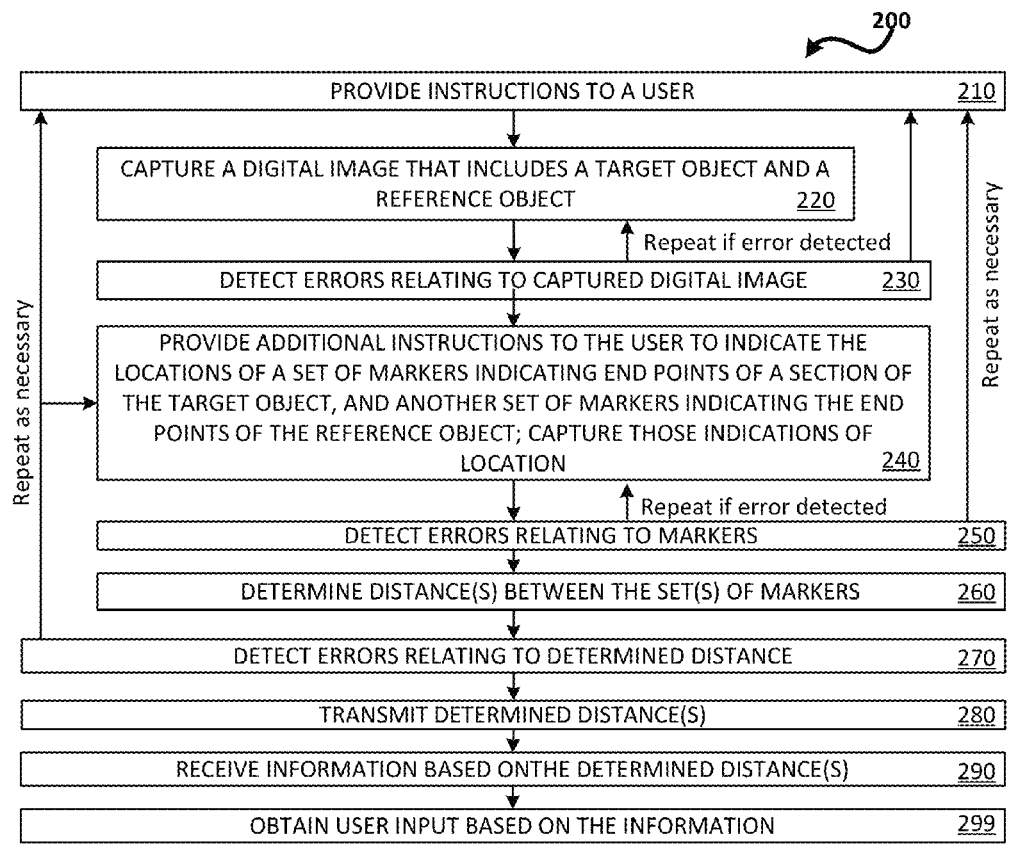

DETECT ERRORS RELATING TO CAPTURED DIGITAL IMAGE

*Determine rotation of object at angle from desired orientation that is substantially parallel to the mirror or camera lens*

Identify central feature of object and corresponding outer features
631A

Measure distances between central feature and each of the corresponding outer features
631B Compare the distances between central feature and each of the corresponding outer features to determine a difference in the distances
631C Determine that object is rotated at an angle from the desired orientation when the difference in the distances exceeds a permitted difference
631D

631

*Determine rotation of reference object at angle about an axis that is substantially perpendicular to the mirror or camera lens*

Identify X and/or Y coordinates of corresponding corners (or other features) of reference object
632A Compare X and/or Y coordinates of corresponding corners to determine a difference in the coordinates
632B Determine that reference object is rotated at an angle from the desired orientation when the difference in the coordinates exceeds a permitted difference
632C

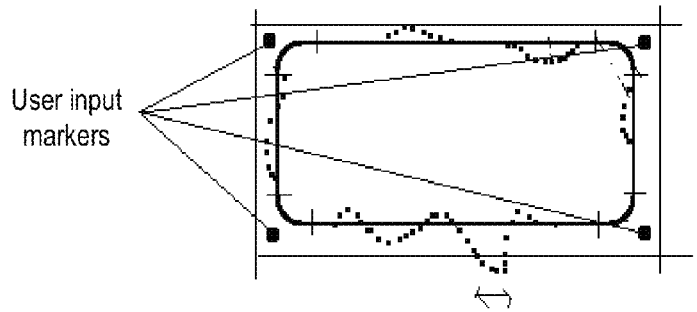
FIGURE 34D  Points not considered (e.g., outside a distance threshold)
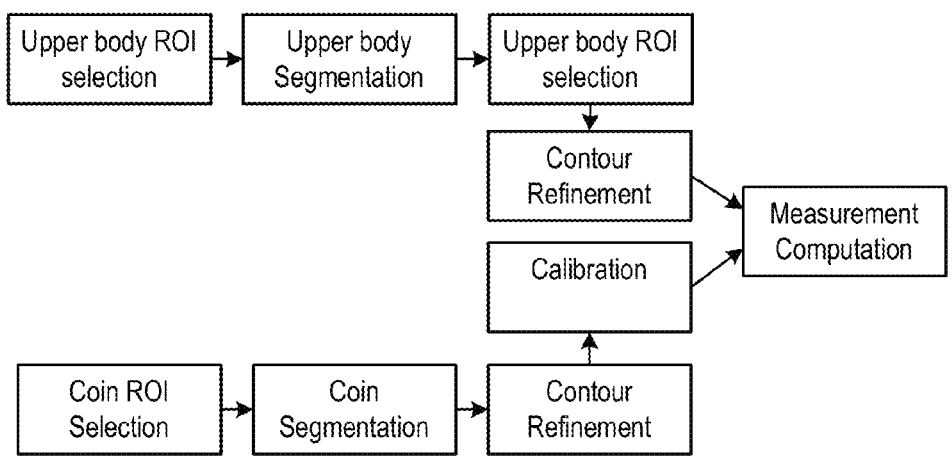
FIGURE 35
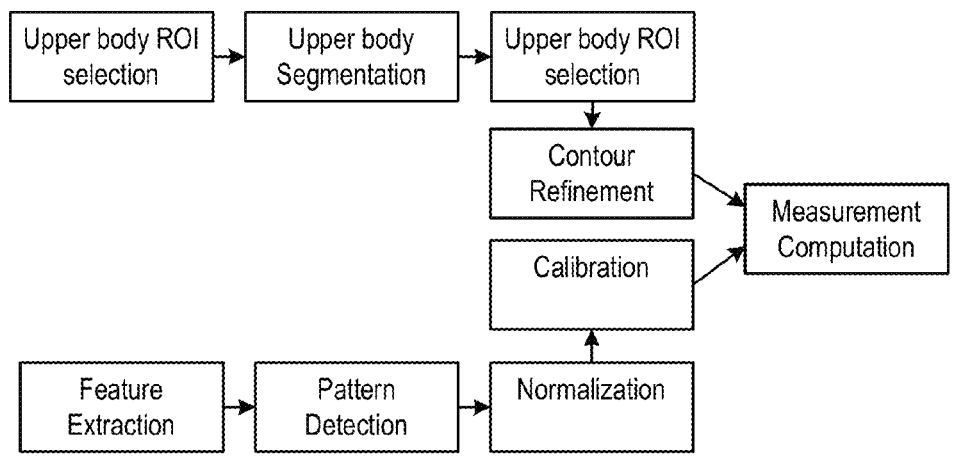
FIGURE 36

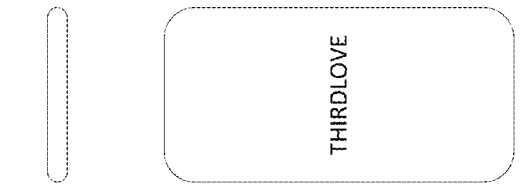
FIGURE 37
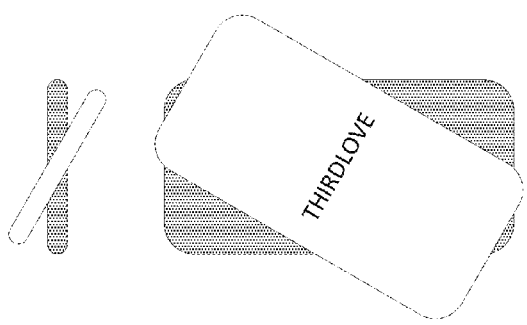
FIGURE 38A
FIGURE 38B
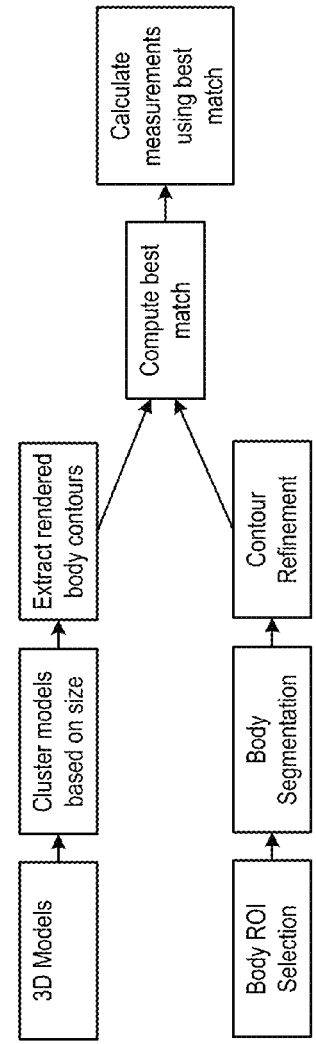
FIGURE 39

DETERMINING DIMENSION OF TARGET OBJECT IN AN IMAGE USING REFERENCE OBJECT

CROSS-REFERENCE TO RELATED APPLICATIONS

This application claims priority under 35 U.S.C. §119(e) to co-pending U.S. Provisional Patent Application No. 61/779,060, filed Mar. 13, 2013, entitled DETERMINING DIMENSION OF TARGET OBJECT IN AN IMAGE USING REFERENCE OBJECT, the content of which is hereby incorporated by reference herein in its entirety for all purposes.

This application claims priority under 35 U.S.C. §119(e) to co-pending U.S. Provisional Patent Application No. 61/836,614, filed Jun. 18, 2013, entitled DETERMINING DIMENSION OF TARGET OBJECT IN AN IMAGE USING REFERENCE OBJECT, the content of which is hereby incorporated by reference herein in its entirety for all purposes.

This application claims priority under 35 U.S.C. §119(e) to co-pending U.S. Provisional Patent Application No. 61/900,961, filed Nov. 6, 2013, entitled DETERMINING DIMENSION OF TARGET OBJECT IN AN IMAGE USING REFERENCE OBJECT, the content of which is hereby incorporated by reference herein in its entirety for all purposes.

This application claims priority under 35 U.S.C. §119(e) to co-pending U.S. Provisional Patent Application No. 61/924,822, filed Jan. 8, 2014, entitled DETERMINING DIMENSION OF TARGET OBJECT IN AN IMAGE USING REFERENCE OBJECT, the content of which is hereby incorporated by reference herein in its entirety for all purposes.

FIELD

The disclosure relates generally to systems and methods for determining one or more dimensions of an object using a digital image. In particular, the disclosure relates to determining an actual dimension of a target object using a reflected image of a reference object and the target object, and further using known dimensions of the reference object.

BACKGROUND

Men and women have various options for purchasing clothing that is sized to fit particular parts of their bodies. For example, men and women can visit retail clothing stores to try on clothing of various sizes, design and fit. However, people following this approach for finding suitably-sized clothing encounter various issues. For instance, clothing often comes in generic "fit all" sizes that lack customization to a person's particular body characteristics. Men and women may also visit a tailor who can measure the particular contours of their bodies. Once the measurements are taken, custom-fit clothing may be manufactured using designs the men and women prefer. However, the cost and time needed to use a tailor may prohibit many men and women from obtaining custom-fit clothing. Better virtual sizing technology that allows men and women to create and buy customized apparel is needed.

SUMMARY

Systems and methods for determining dimensions of an object using a digital image are disclosed. In particular, systems and methods for determining an actual dimension of a target object using a digital image of that object along with a reference object are disclosed. The digital image may be of a mirrored reflection of the reference and target objects.

DRAWINGS

FIG. 1 illustrates a system that determines dimensions of an object.

FIGS. 2-8 illustrate different processes for determining dimensions of an object.

Figure 7:
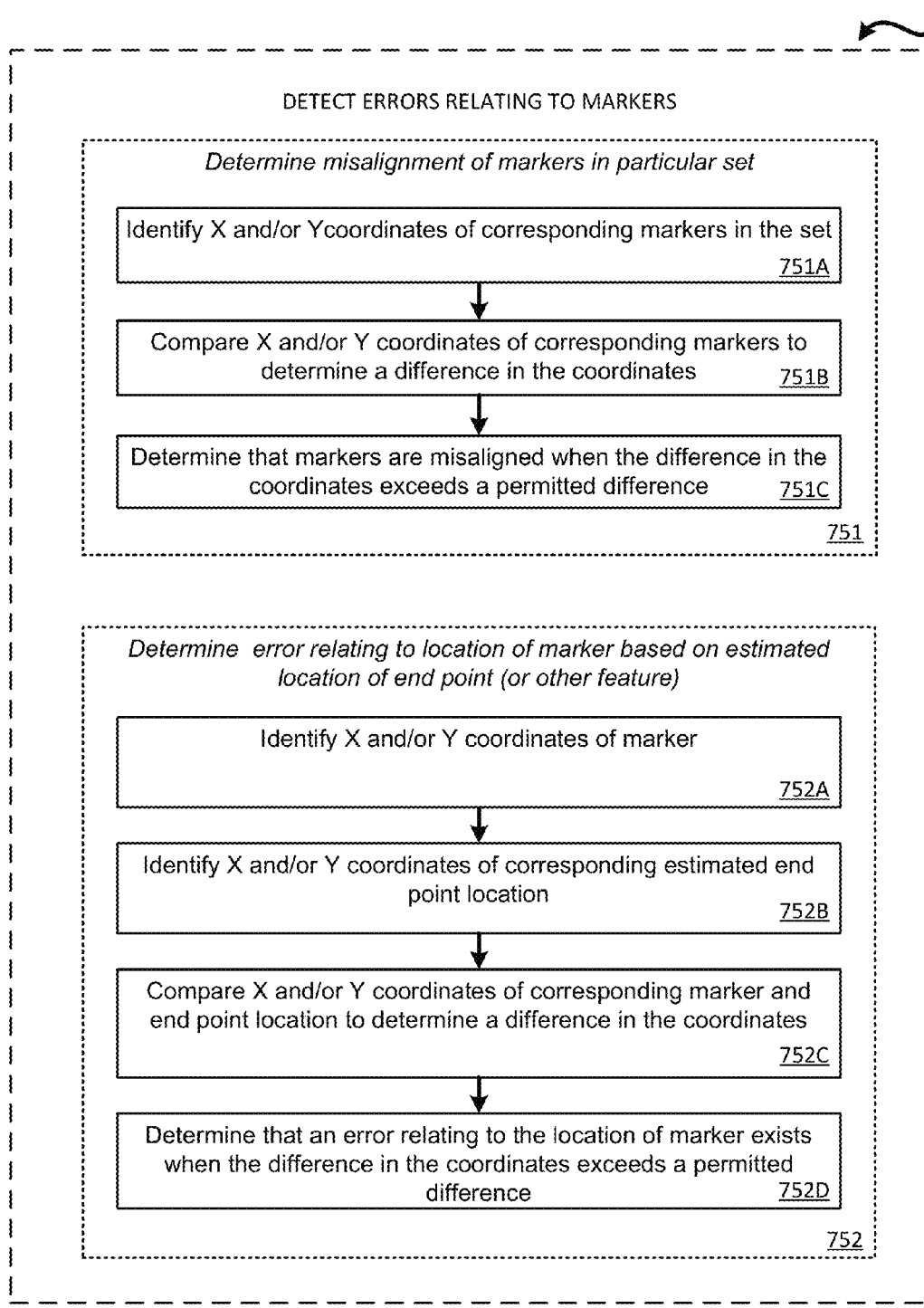
Figure 8:
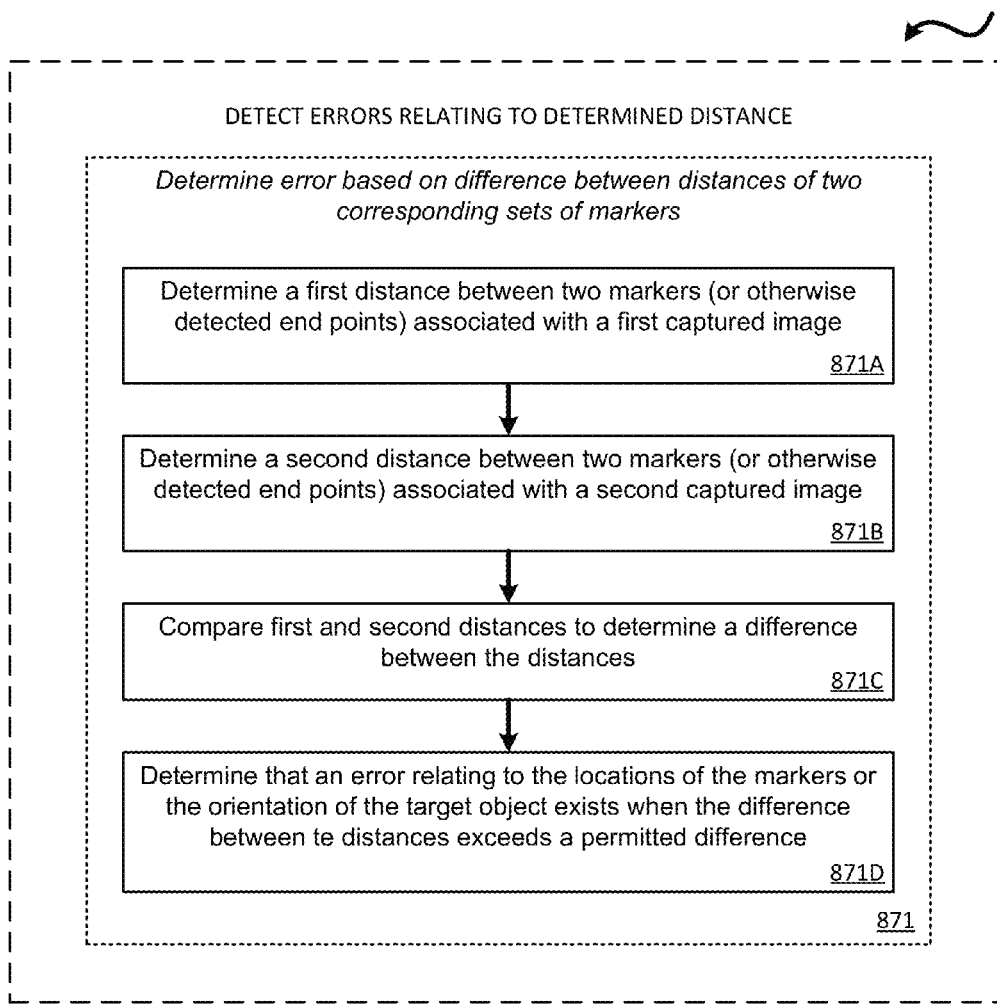
Figure 9A:
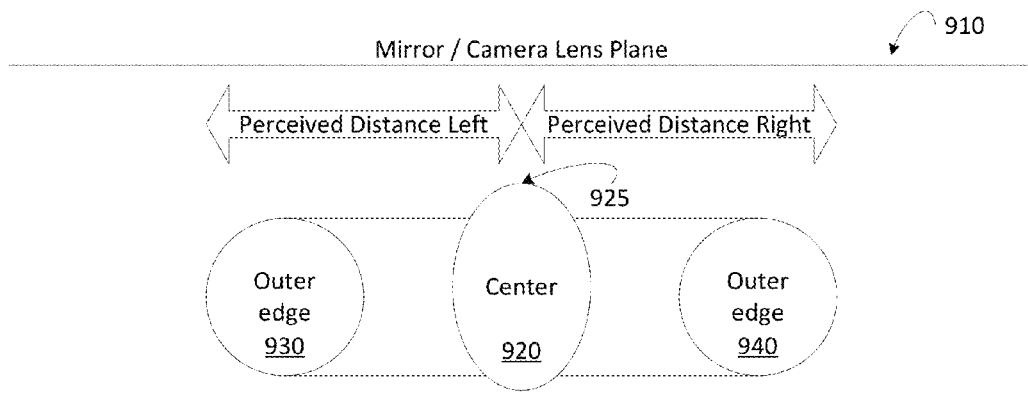
Figure 9B:
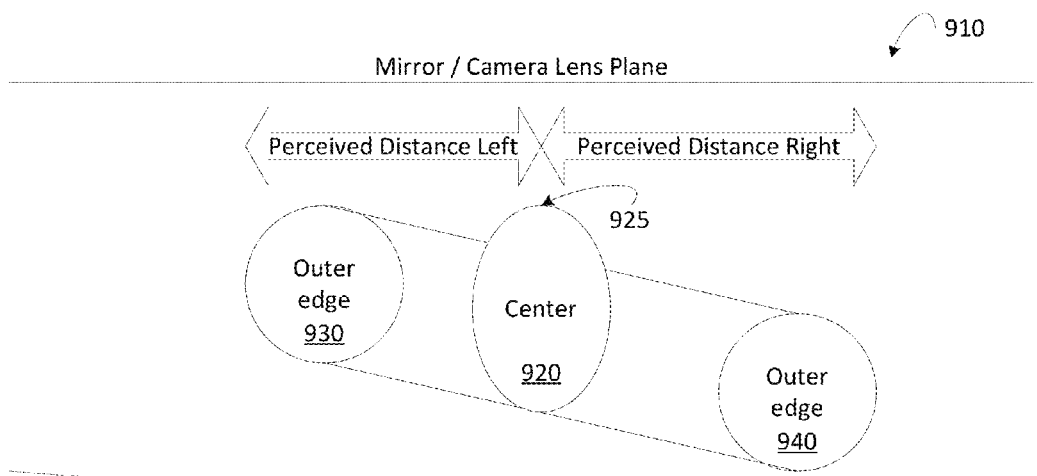

FIGS. 9A-B illustrate error detection with respect to certain aspects of FIGS. 2-8.

Figure 10:
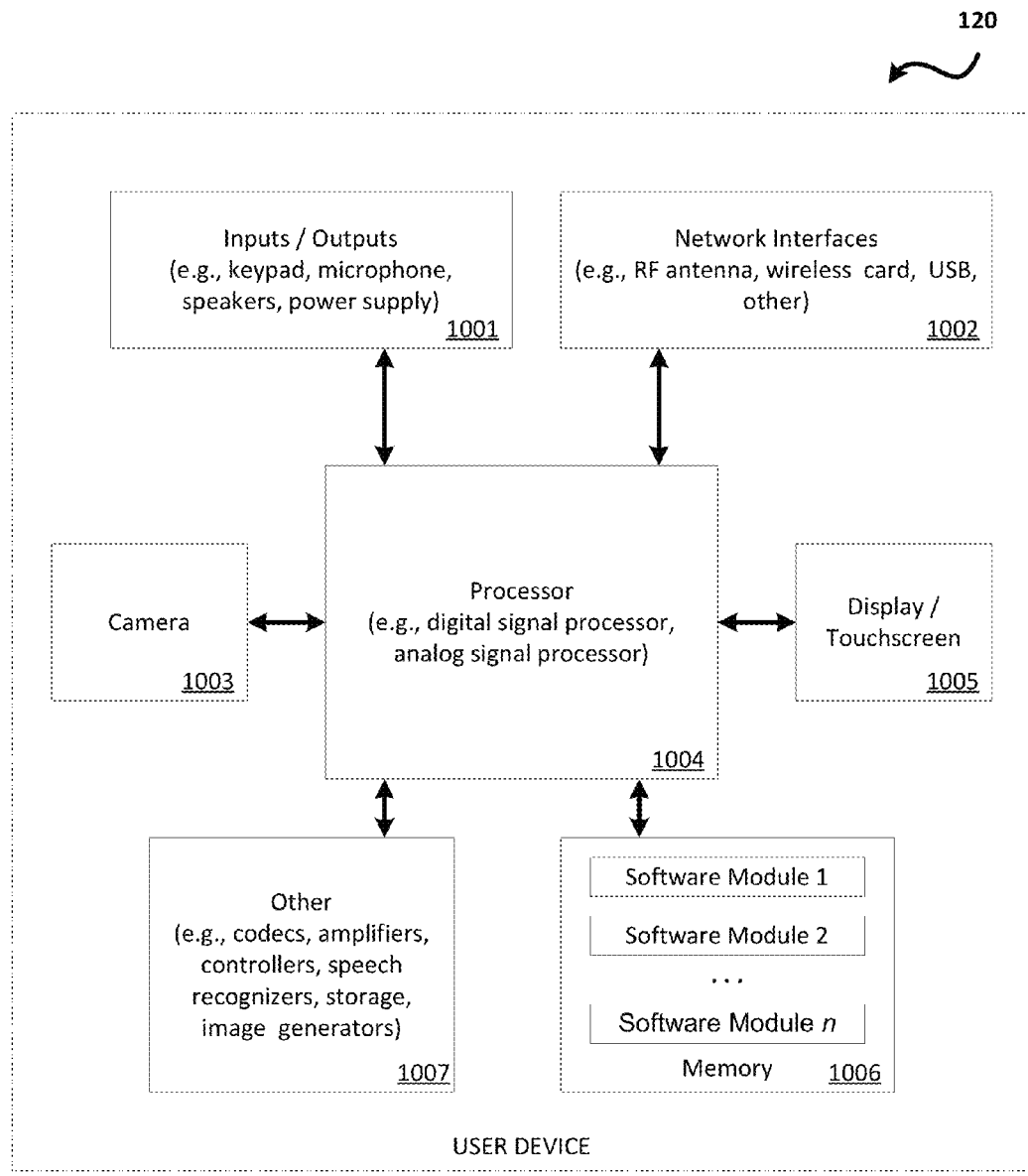

FIG. 10 illustrates a user device for determining dimensions of an object.

FIGS. 11-18 illustrate user interfaces for determining dimensions of an object.

Figure 19A:
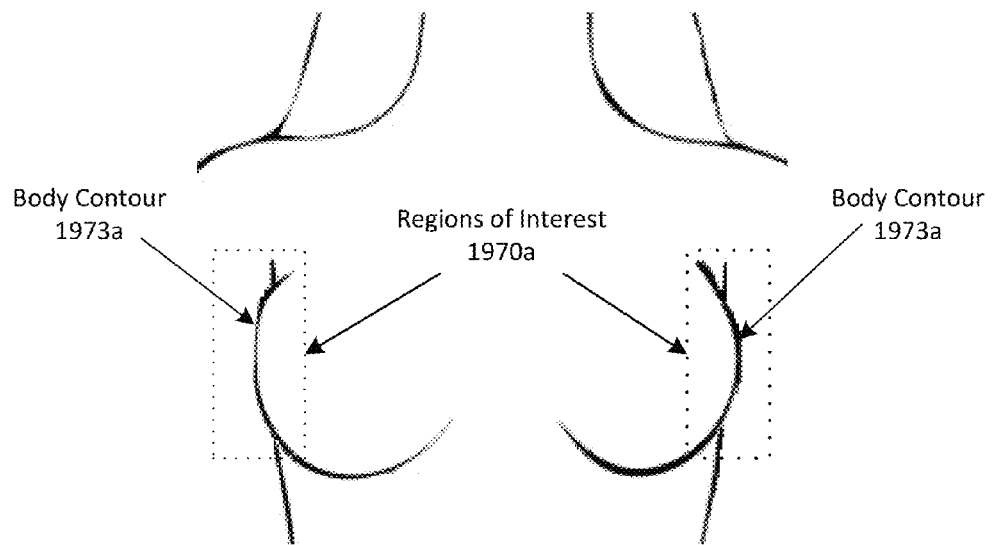
Figure 19B:
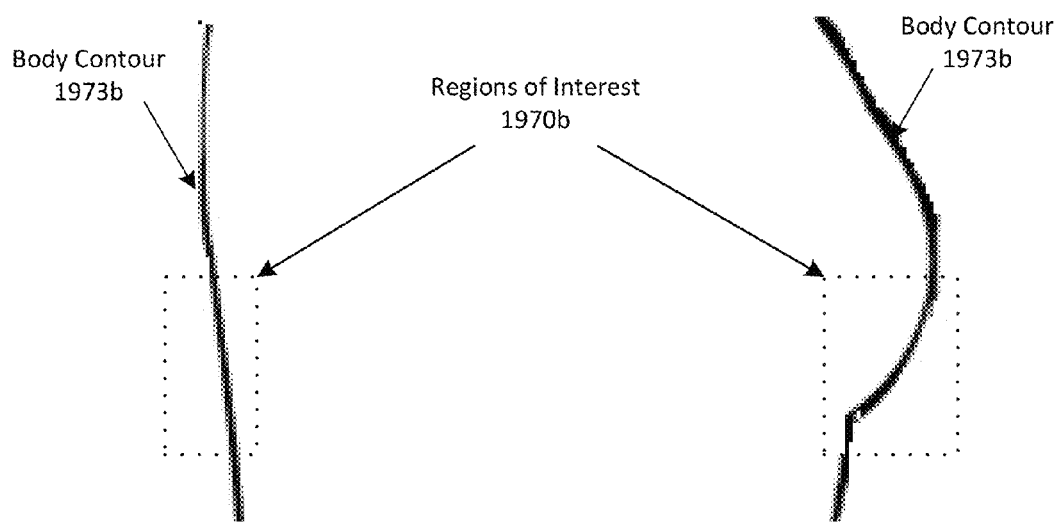

FIGS. 19A-B illustrate ROIs and contours.

Figure 20A:
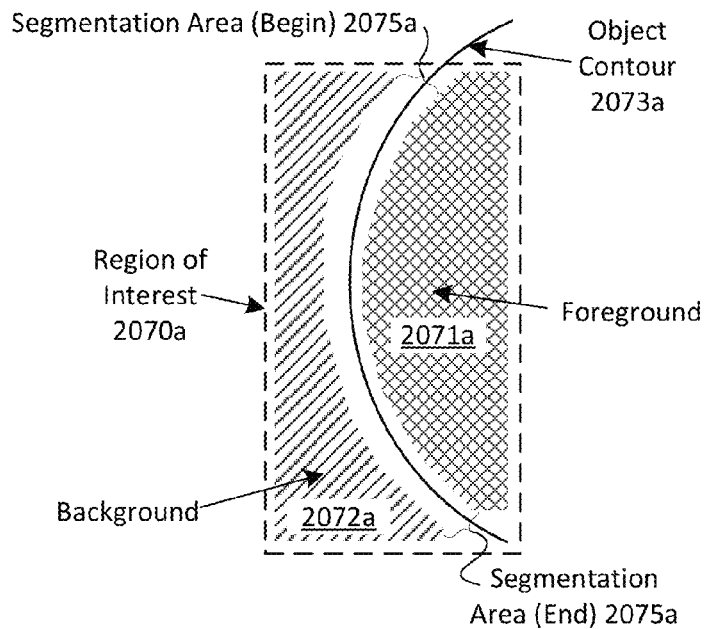
Figure 20B:
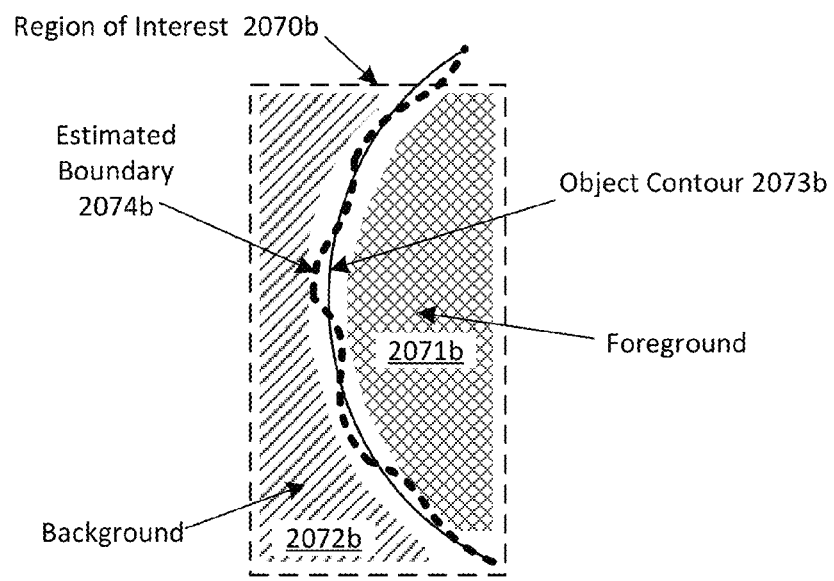

FIGS. 20A-B illustrate ROIs, contours, and segmentation areas.

Figure 21:
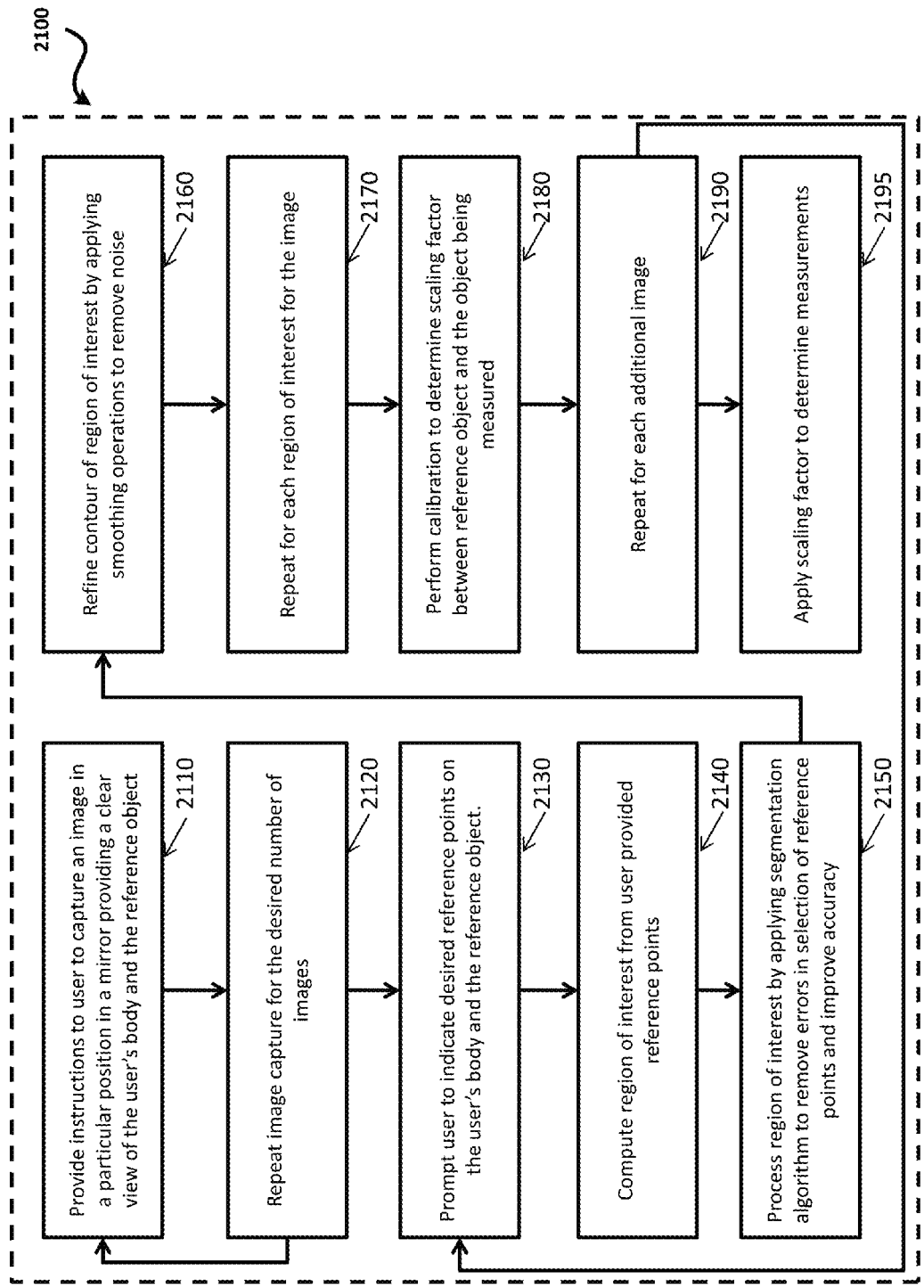

FIG. 21 illustrates a process for determining dimensions of an object.

Figure 23:
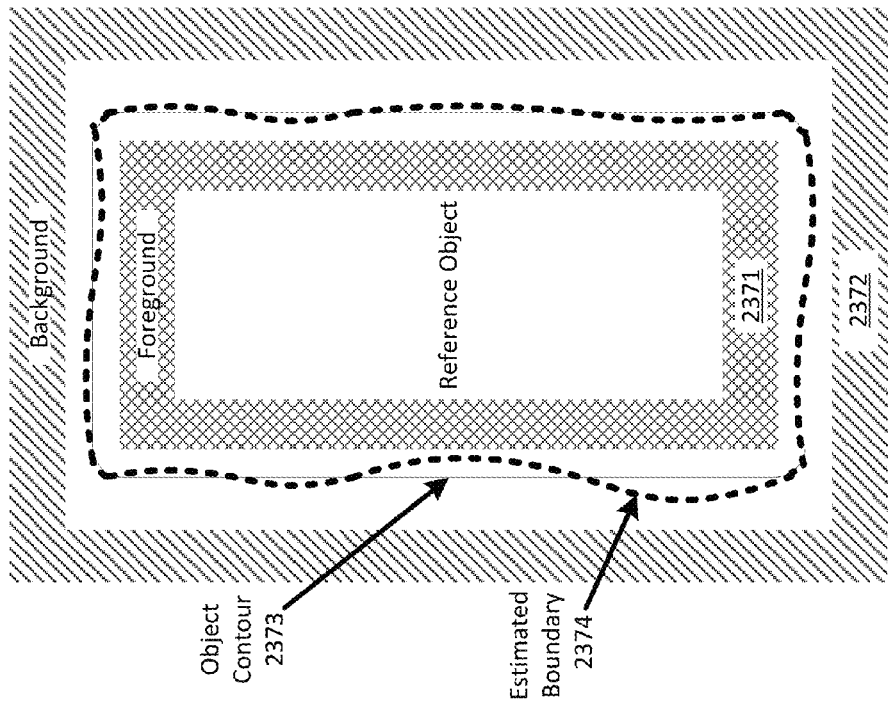
Figure 22:
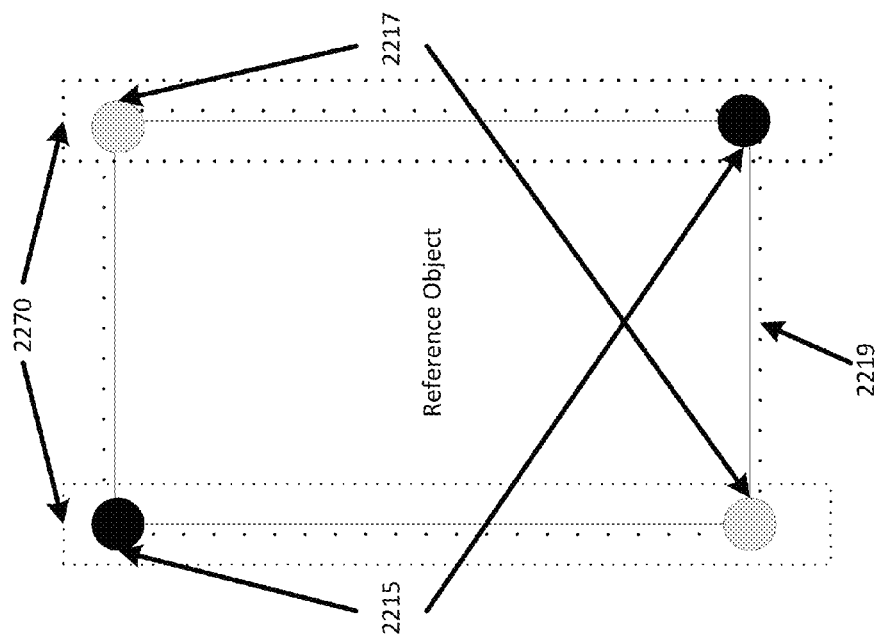

FIGS. 22-23 illustrate reference points and boundary detection.

Figure 24:
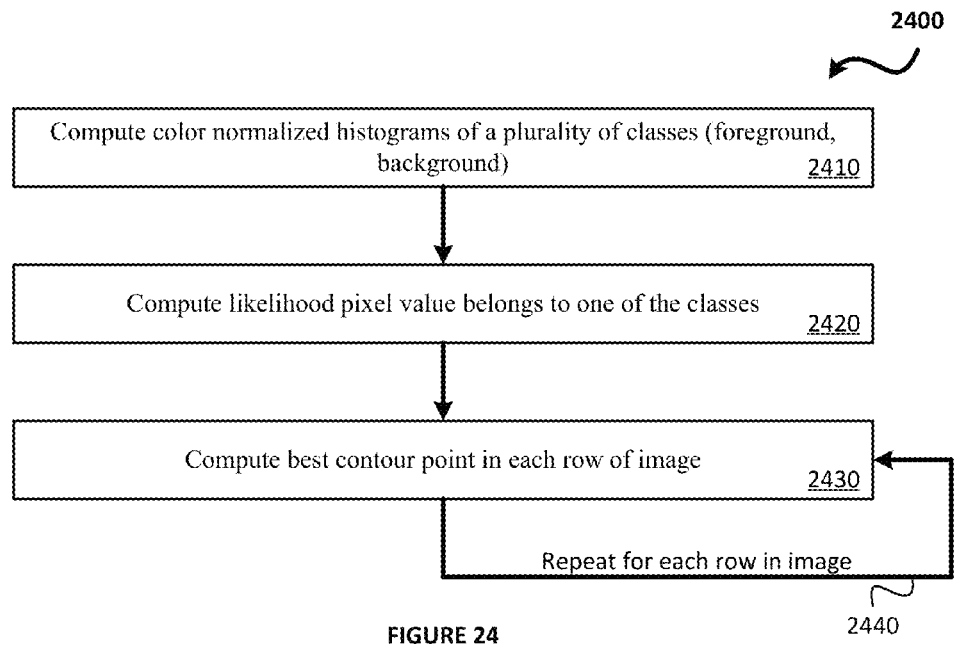

FIG. 24 illustrates image segmentation process.

Figure 25:
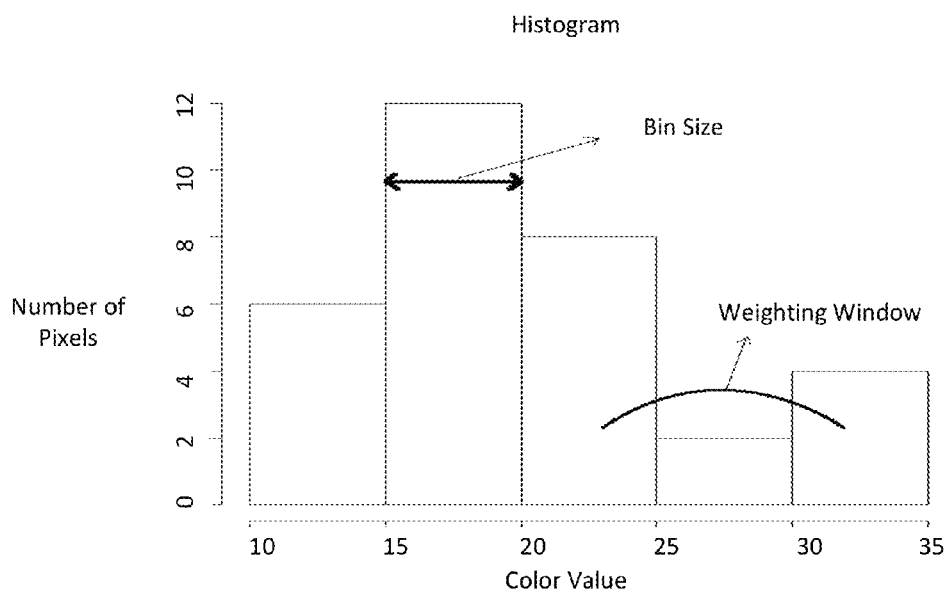

FIG. 25 illustrates a histogram representing foreground or background values.

Figure 26:
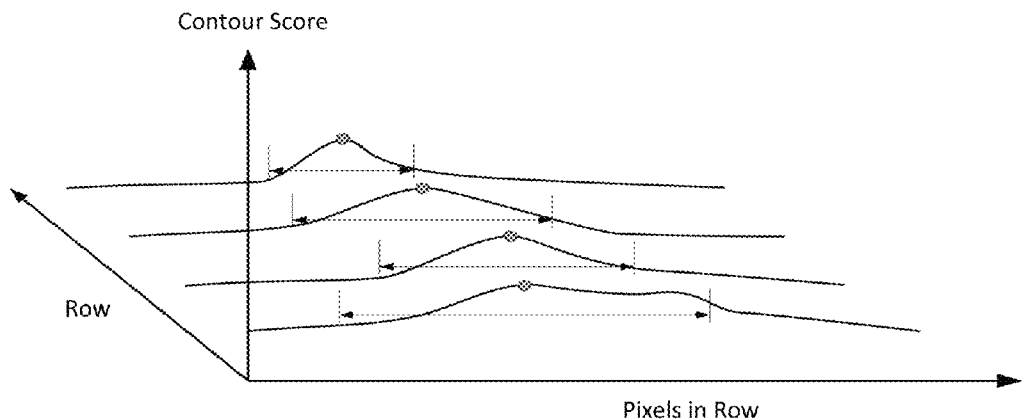

FIG. 26 depicts a graph of contour scores for different pixels in different rows.

Figure 27:
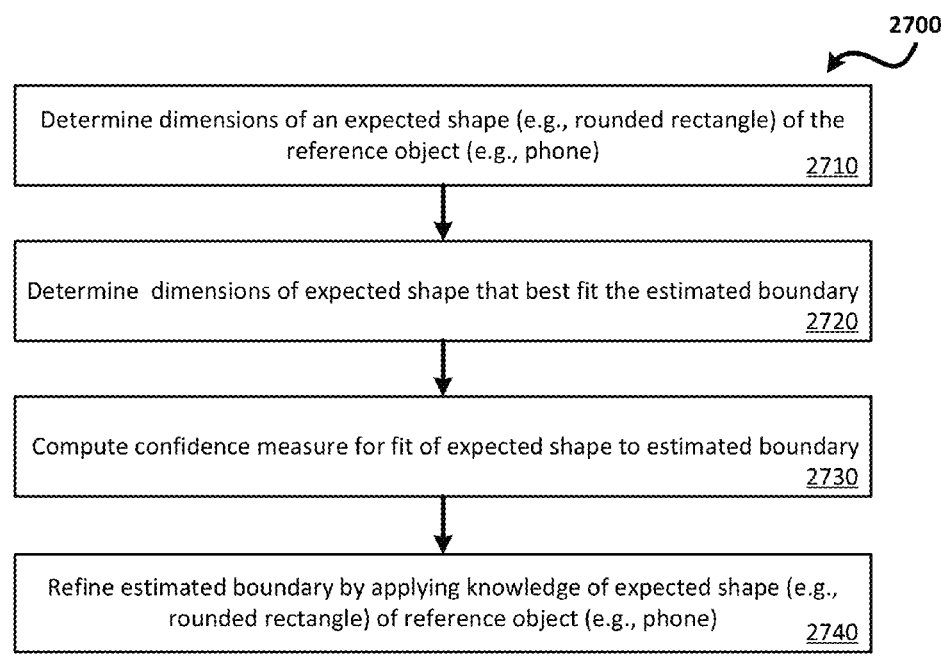

FIG. 27 depicts a process for estimating an object's shape

Figure 28:
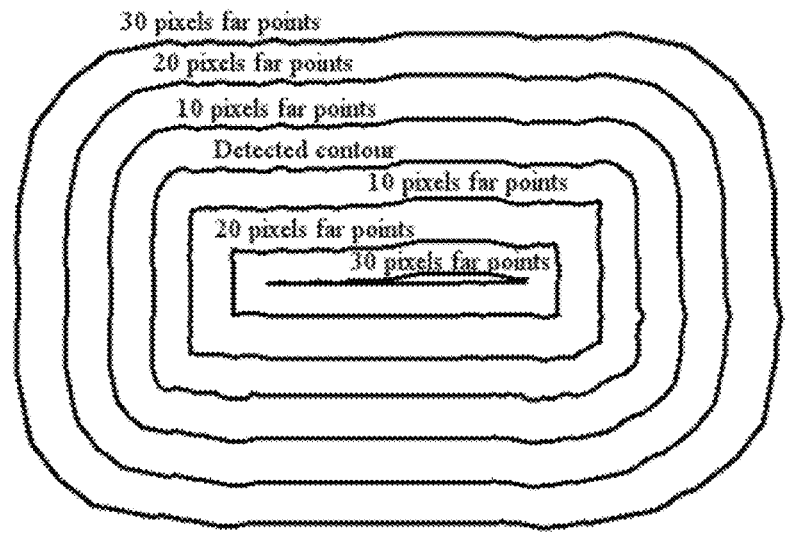

FIG. 28 depicts a distance map.

Figure 29:
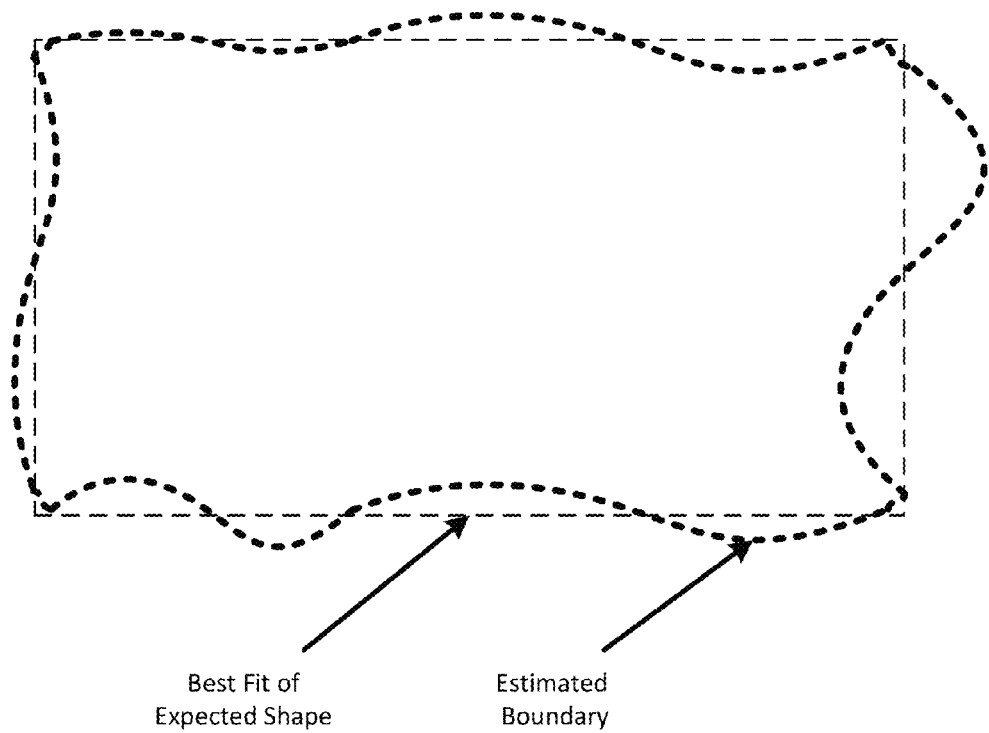

FIG. 29 depicts a "best-fit" shape in relation to an estimated boundary.

Figure 30:
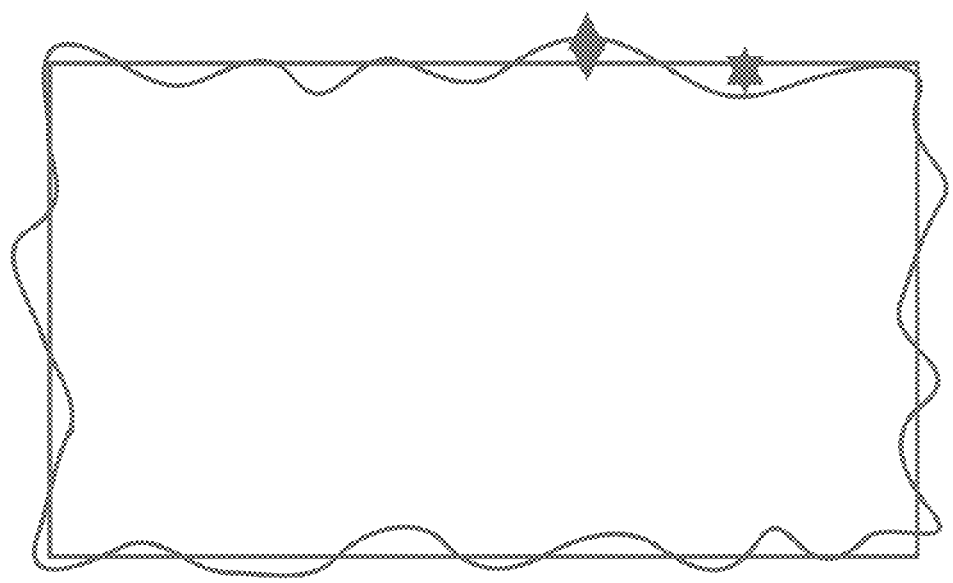

FIG. 30 illustrates an acceptable confidence measure.

Figure 31:
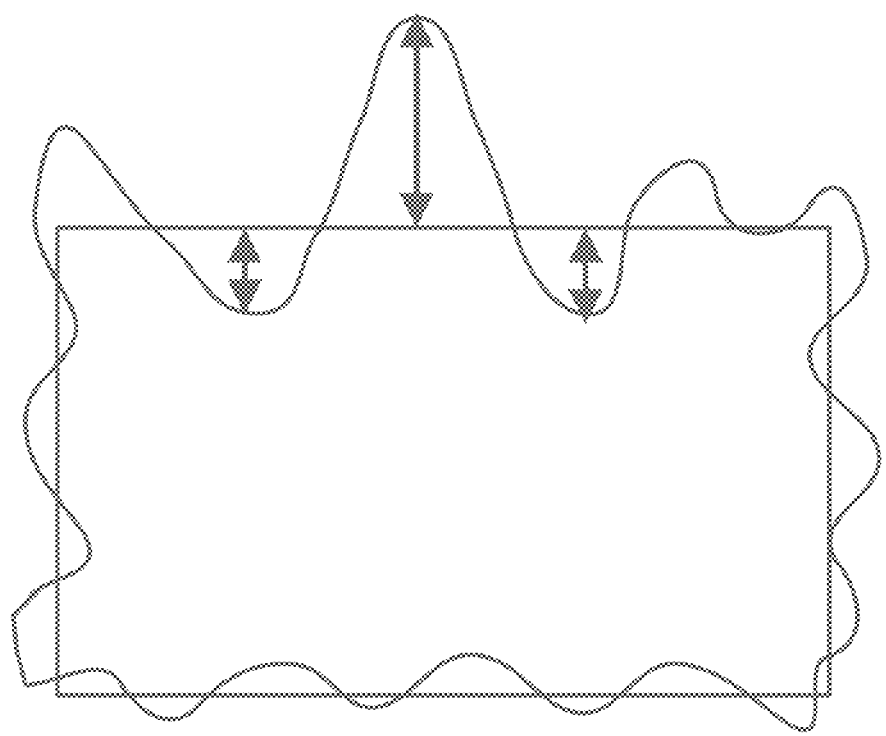

FIG. 31 illustrates an unacceptable confidence measure.

Figure 32:
Figure 33:
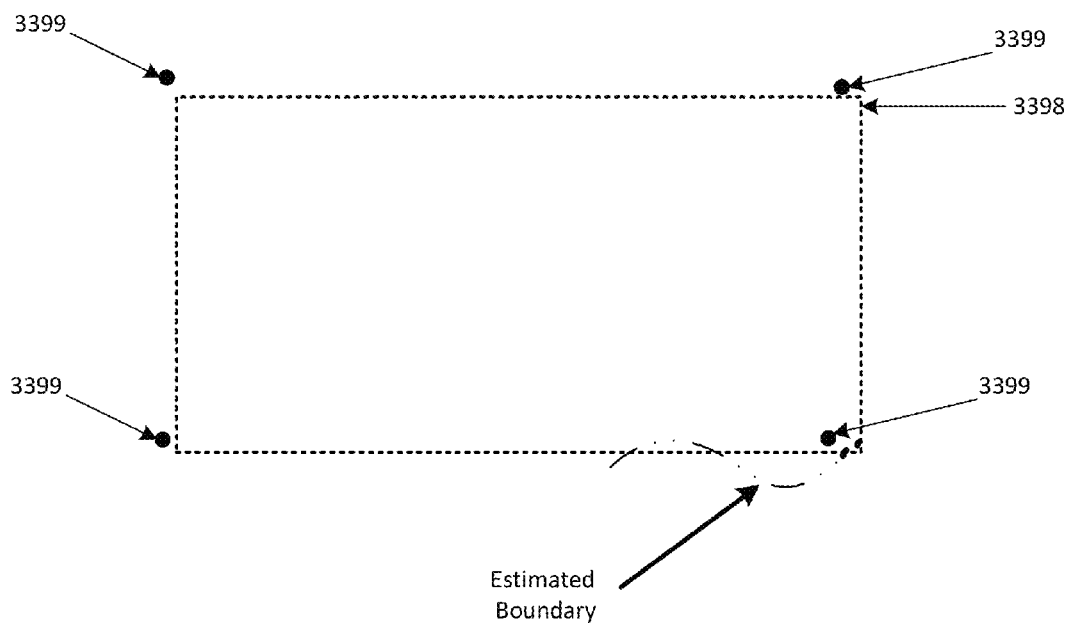

FIGS. 32-33 illustrate embodiments for estimating contours of objects.

FIGS. 34A-D illustrates implementations relating to identifying segments for use during estimation of an object's contour.

FIG. 35 depicts a process for measurement estimation using a Coin Method.

FIG. 36 depicts a process measurement estimation using a Pattern Method.

FIG. 37 depicts desired alignment characteristics of device phone.

FIGS. 38A and 38b depict a user interface that displays current orientations of an image capturing device relative to a desired orientation.

FIG. 39 depicts a process relating to a 3D model contour comparison embodiment.

Figure 40A:
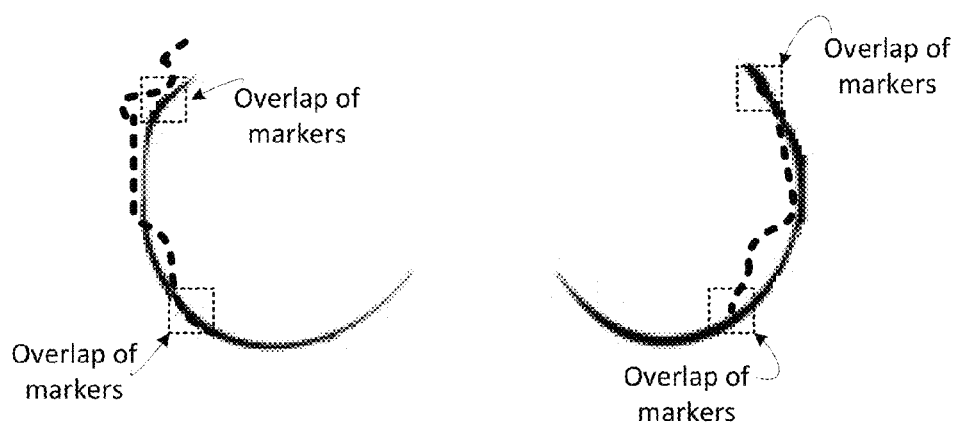
Figure 40B:
Figure 40C:

FIGS. 40A-C depict overlapped contours using a method that aligns user and modeled contours based on locations of markers corresponding to those contours.

Figure 41A:
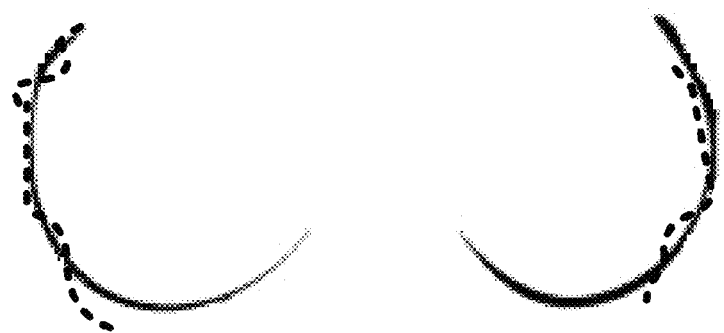
Figure 41B:
Figure 41C:

FIGS. 41A-C depict overlapped contours using a method that aligns user and modeled contours based on widths between points on the contours.

DESCRIPTION

Attention is now drawn to FIG. 1, which depicts a system 100 for determining dimensions of a target object. The system 100 depicted in FIG. 1 may take various configurations within the scope and spirit of the disclosure. For example, the disclosed system may include various components, including a network 101, a backend system 110, and one or more user devices 120. Certain aspects of these components are described below.

Network 101

The network 101 may be any suitable type of network. The network 101 may provide communication links among the backend system 110 and the user device(s) 120. Examples of communication links include the Internet, private networks, local area networks (e.g., LAN, WiLAN, Wi-Fi, Bluetooth), cellular or other over-the-air wireless carrier interfaces, and other wired and wireless communication pathways.

As those skilled in the art may appreciate, various intermediary network routing and other elements between the network 101, the backend system 110 and the user device(s) 120 depicted in FIG. 1 have been omitted for the sake of simplicity. Such intermediary elements may include, for example, the public switched telephone network (PSTN), gateways or other server devices, and other network infrastructure provided by Internet services providers (ISPs) and/or cellular carrier providers.

Backend System 110

As shown in FIG. 1, the backend system 110 may include various components, including one or more databases 112, one or more servers or suitable computing devices 114, and one or more network interfaces 116.

The database 112 may serve as a centralized data bank of data, including information regarding one or more users and one or more commercial enterprises offering goods or services to the users based on user information generated by certain features of this disclosure. The database 112 may be configured as a hard disk drive for convenience, but this is not required, and one of ordinary skill in the art may recognize that other storage media may be utilized without departing from the scope of the disclosure. In addition, one of ordinary skill in the art may recognize that the database 112 which is depicted as a single storage device, may be realized by multiple, distributed storage devices. The database 112 may store data in a fixed file format, such as XML, comma separated values, tab separated values, fixed length fields, or any other acceptable format.

Although not shown, the backend system 110 (or certain of its components like server/computing device 114) may include memory from which software may be executed. The software may include various software modules for carrying out or otherwise supporting various aspects of the system 100, the methods shown in FIGS. 2-8, and/or the user interfaces shown in FIGS. 11-20. The server 114 may execute instructions embodied in such software stored on memory.

Although not shown, the backend system 110 may connect to third party systems with similar components to those shown for the backend system 110. Such third party systems may store data regarding commercial products and services that relate to user data collected from the user device(s) 120.

One of skill in the art may appreciate that the backend system 110 may include additional components not shown, and/or may include only a subset of the components shown in FIG. 1. These various components may help facilitate communications between the user and the rest of the system 100, and may perform various processing of information received from the user device(s) 120 and/or other components not shown.

User Device 120

The user device(s) 120 may include any suitable computing device or combination of computing devices. Multiple user devices 120 may be used by multiple users, and different users may use different user devices 120 to carry out various aspect of the disclosure. Examples of well-known computing devices, systems, environments, and/or configurations that may be suitable as a user device 120 include, but are not limited to, personal computers, server computers, tablets, mobile "smart" phones, laptops, multi-processor systems, microprocessor-based systems, programmable consumer electronics, networked PCs, minicomputers, mainframe computers, cameras and distributed computing environments that include any of the above systems or devices. Accordingly, one or more aspects taught herein may preferably be incorporated into a smart phone or other computing device with a camera and built-in capability to connect to the network 101 using wired or wireless technologies.

Attention is momentarily drawn to FIG. 10, which depicts one type of a suitable user device 120. One of skill in the art may appreciate that the components in FIG. 10 are provided for illustration, not limitation. Additional components and features are readily understood by one of skill in the art. As shown, the user device 120 may include various components, including inputs and outputs 1001 (e.g., keypad, microphone, speakers, power supply, among others), network interfaces 1002 (e.g., RF antenna, Bluetooth and Wi-Fi ports, wireless card, USB port, among others), a camera 1003, a processing component (e.g., a processor 1004), a display/touchscreen 1005, memory 1006 from which software may be executed (e.g., including various software modules) to carry out various aspects of the methods described herein, and other components 1007.

The software modules may run as an application (e.g., a web-based application), and may be compatible with any computing device, including devices that support a standard web-browser, and preferably would exhibit the same appearance and functionality on each. For example, the software modules may be executed by a web server (not shown), which communicates with the other components in the system 100 to cause the display of a software-based interface on the display 1005. A user, for example, may interact with the software modules via various features on the user device 120, including a graphic user interface ("GUI"), to access certain aspects of the disclosure. Of course, other types of applications other than web-based applications are contemplated that allow the user to view data from, send data to, and otherwise interact with the other components in the system 100.

The software modules may each correspond to different operations or steps of different methodologies described herein. The methods described herein may be embodied in program code represented by the software modules that then may be executed by a processing component (e.g., processor 1004). The program code may relate to a web-based or resident computer application that operates on the device 120.

Aspects Relating to Methodologies Performed by Systems

Attention is now drawn to FIG. 2, which depicts a method for determining one or more dimensions of a target object. The method depicted in FIG. 2 may include various operations within the scope and spirit of the disclosure. For example, the disclosed method may include the following operations.

At operation 210, a user device 120 provides instructions to a user. By way of example, the instructions may instruct the user to stand in a particular position relative to a mirror so that a portion of the user's body is reflected in the mirror.

Figure 11:
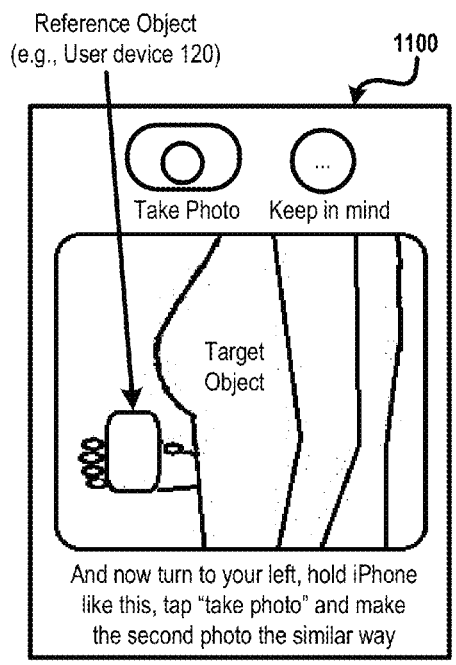
Figure 14:
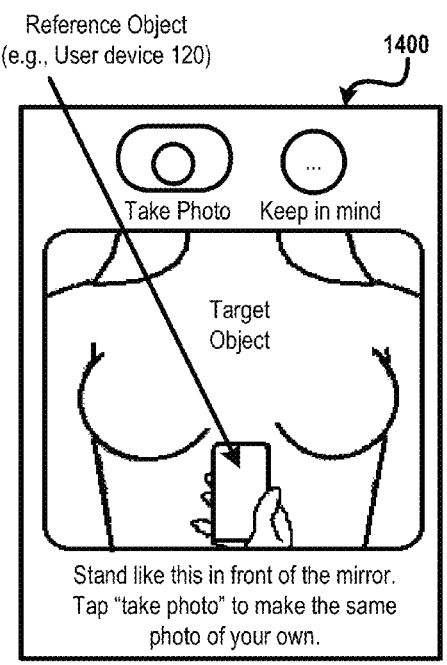

The instructions may further instruct the user to hold the user device at a particular position relative to that portion of the user's body so that the user device 120 is similarly reflected in the mirror, and so the user device 120 is capable of capturing the reflection of the user's body and the user device 120 caused by the mirror. Particular examples of such instructions are illustrated in FIGS. 11 and 14, which are described later.

Figure 3:
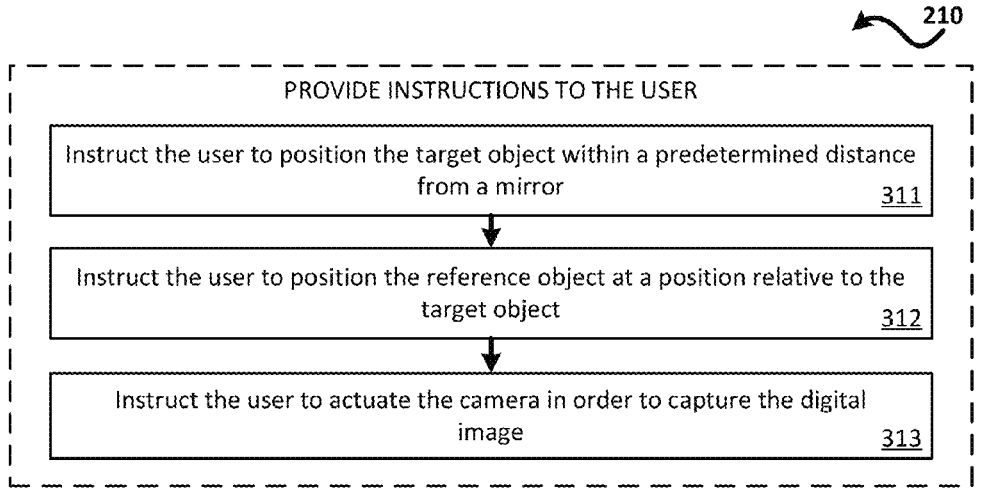

Attention is momentarily drawn to FIG. 3, which illustrates instructions provided by the user device 120 to the user. At operation 311, the user is instructed to position a target object (e.g., a front or side portion of the user's body) within a predetermined distance from a mirror. Alternatively, the user could position the target object in front of a camera; however, placing the target object (e.g., a portion of the user's body) in front of a mirror is preferred. At operation 312, the user is instructed to position a reference object (e.g., the phone with built-in camera, or another camera) at a position relative to the target object. For example, the user may be instructed to position the reference object within a distance from an end point of the target object, or to position the reference object so as to cover part or all of a section of the target object. Alternatively, the instruction may be to position the reference object along a first plane that is offset within a predetermined distance from a second plane of the target object, where the first plane is substantially parallel to the second plane. Although not preferred, a reference object other than the phone with built in camera may be used where the target object is placed in front of a camera instead of a mirror. At operation 313, the user is instructed to actuate the camera in order to capture a digital image including the target object and the reference object.

Attention is now returned to FIG. 2 and operation 220, which specifies that the user device 120 captures the digital image that includes the target object (e.g., front or side portion of the user's body) and the reference object (e.g., the user device 120 with built-in camera).

At operation 230, the user device or remote processing device (e.g., server) detects errors relating to the captured digital image. For example, one error may relate to a front/side portion of a user's body that is rotated at an angle from a desired orientation along a plane that is substantially parallel to a plane of the mirror (or camera lens). A similar error may apply to the reference object. Another error may relate to a reference object that is rotated about an axis that is substantially perpendicular to the mirror or camera lens.

Attention is momentarily drawn to FIG. 6, which illustrates different examples for detecting errors relating to the captured digital image. Operation 631, which relates to determining a rotation of a target object at angle from a desired orientation along a plane that is substantially parallel to a plane of the mirror or camera lens, includes sub-operations. At sub-operation 631A, a central feature of the target object (e.g., a face of a body) and corresponding outer features (e.g., shoulders) are identified. The features may be identified using image recognition or markers set by a user. At sub-operation 631B, distances between the central feature of body and each of the corresponding outer features are measured. Measurements may be of a number of pixels between the respective features, of by another measurement technique known in the art. At sub-operation 631C, a comparison is made of the distances between the central feature of body and each of the corresponding outer features to determine a difference in the distances. At sub-operation 631D, a determination is made as to whether that target object is rotated at an angle from the desired orientation when the difference in the distances exceeds a permitted difference.

Operation 632, which relates to determining a rotation of reference object at angle about an axis that is substantially perpendicular to a plane of the mirror or camera lens, also includes sub-operations. At sub-operation 632A, X and/or Y coordinates of corresponding corners (or other features) of reference object are identified. At sub-operation 632B, a comparison is made of the X and/or Y coordinates of corresponding corners to determine a difference in the coordinate values. At sub-operation 632C, a determination is made as to whether the reference object is rotated at an angle about the axis that is substantially perpendicular to a plane of the mirror or camera lens by determining whether the difference in the coordinates exceeds a permitted difference.

Attention is returned to FIG. 2, which illustrates that operation 220 may be repeated if an error is detected at operation 230. One of skill in the art may appreciate that operation 230, or other operations, may be performed before preceding operations or after subsequent operations, or may not be performed.

At operation 240 additional instructions may be provided to the user to select locations of one or more sets of markers so as to indicate end points or boundaries of a section of the target object. The user may be further instructed to select locations of one or more sets of markers so as to indicate the end points or boundaries of the reference object. The user device 120 captures those indications of marker locations.

Figure 4:
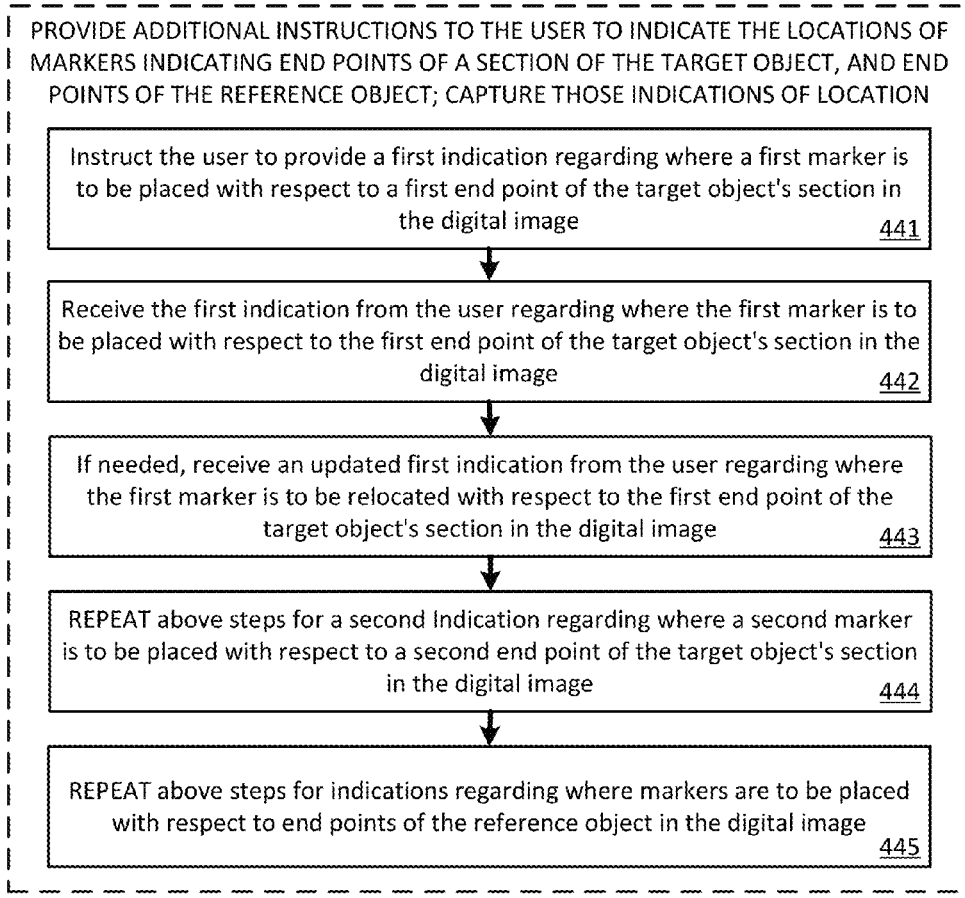
Figure 5:
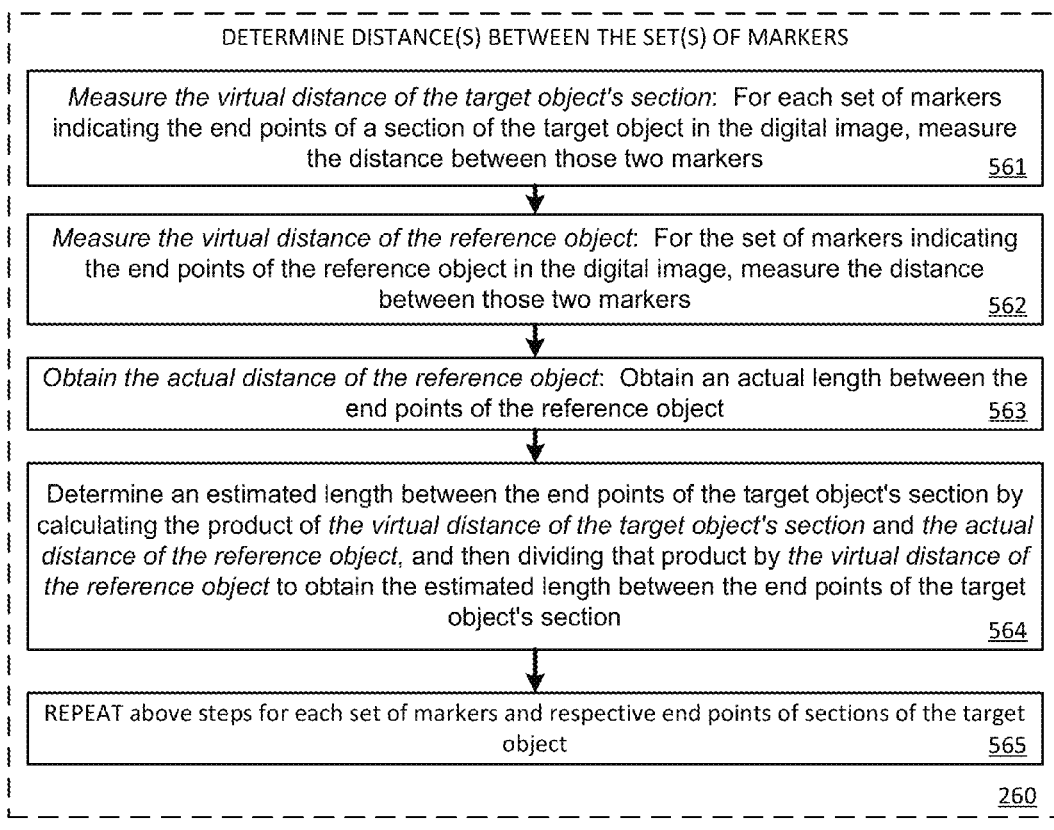

Attention is momentarily drawn to FIG. 4, which illustrates one example for providing the additional instructions at operation 240. At operation 441, instructions may be provided for setting a location of a first marker with respect to a first end point of the target object's section in the digital image. For example, the first marker may be presented on a screen and overlaid on top of the digital image. The user may then move the first marker over the first end point using his or her finger or stylus when a touchscreen is used, or using another technique (e.g., a mouse or track ball) when a touchscreen is not available on the user device 120.

At operation 442, the location of the first marker is identified after the user moves that first marker at or near the first end point of the target object's section in the digital image. At operation 443, if needed, the user may update the location of the first marker by relocating it closer to or at the first end point. For example, the user device 120 may present the user with a zoom feature that permits the user to zoom into parts of the digital image to more-precisely place the first marker. The identified location of the first marker is updated after the user more-precisely places the first marker.

At operation 444, preceding operations may be repeated for a second marker placed with respect to a second end point of the target object's section in the digital image. At operation 445, preceding operations may be repeated for additional sets of markers with respect to end points of other sections of the target object and/or the reference object in the digital image.

Attention is now returned to FIG. 2 and operation 250, which detects errors relating to markers. Such errors may relate to when the location of markers in a particular set do not have the substantially same X coordinate if markers are expected to be vertically aligned, or Y coordinate if markers are expected to be horizontally aligned. Other errors may relate to when the location of a marker is not within acceptable distance from a detected end point (e.g., using boundary/edge detection technologies). When errors are detected, operation 240 may be repeated, or operation 210 may be repeated.

Attention is momentarily drawn to FIG. 7, which illustrates different examples for detecting errors relating to the markers of operation 250 in FIG. 2. Operation 751, which relates to determining a misalignment of markers of a particular set, includes sub-operations. At sub-operation 751A, X and/or Y coordinates of corresponding markers in the set are identified. At sub-operation 751B, a comparison is made of the X and/or Y coordinates of corresponding markers to determine a difference in the coordinates. At sub-operation 751C, a determination is made as to whether the markers are misaligned based on whether the difference in the coordinates exceeds a permitted difference value.

Operation 752, which relates to determining an error relating to a location of a marker based on an estimated location of an end point (or other feature), includes sub-operations. At sub-operation 752A, X and/or Y coordinates of marker are identified. At sub-operation 752B, X and/or Y coordinates of a corresponding estimated end point location of one section of the target object is also identified. The estimated location may be determined using image recognition technology such as color boundary detection to detect the end point with respect to another part of the digital image. At sub-operation 752C, a distance between the X and/or Y coordinates of the respective marker and estimated end point location is determined. At sub-operation 752D, a determination is made as to whether an error relating to the location of marker based on whether the difference in the coordinates exceeds a permitted difference.

At operation 260, a distance between a set of markers is determined. Alternatively, distances between end points of the sections of the target objects may be made without the aid of markers by using various image recognition techniques known in the art. Attention is momentarily drawn to FIG. 5, which illustrates one example of a method for determining distances between a set of markers. At operation 561, a "virtual" distance of the target object's section in the digital image is measured. For example, the distance between a set of markers indicating the end points of a section of the target object in the digital image may be measured by determining the number of pixels between those two markers, or performing another type of distance measurement known in the art.

At operation 562, a "virtual" distance of the reference object in the digital image is measured. For example, the distance between a set of markers indicating the end points of the reference object in the digital image may be measured by determining the number of pixels between those two markers, or performing another type of distance measurement known in the art.

At operation 563, the actual distance of the reference object is determined. For example, the user device 120 (or backend system 110 where the distance is determined at the backend system 110) may obtain an actual length between the end points of the reference object. The user device 120 may look up the respective dimension of the reference object (e.g., a dimension the phone with built-in camera).

At operation 564, an estimated actual length between the end points of the target object's section is determined by calculating the product of the virtual distance of the target object's section and the actual distance of the reference object, and then dividing that product by the virtual distance of the reference object to obtain the estimated actual length between the end points of the target object's section.

At operation 565, various operations may be repeated for each set of markers associated with end points of sections of the target object.

Attention is now returned to FIG. 2 and operation 270, which detects errors relating to determined distance. Such errors may relate to when distance determined from the locations of markers in one captured image of a target object differs from distance determined from the locations of corresponding markers in another captured image distance. For example, the two images may be of the same side of the target object at two instances of time. The two images may be of the same side of the target object at different distances from the mirror. Alternatively, the two images may be of different sides of the target object. When errors are detected, operation 240 may be repeated, or operation 210 may be repeated.

Attention is momentarily drawn to FIG. 8, which illustrates different examples for detecting errors relating to distances between markers of operation 270 in FIG. 2. Operation 871, which relates to determining an error based on a difference between distances of two corresponding sets of markers, includes sub-operations. At sub-operation 871A, a first distance between two markers (or detected end points) associated with a first captured image is determined. For example, the first captured image may be of the left side of the target object. At sub-operation 871B, a second distance between two markers (or otherwise detected end points) associated with a second captured image is determined. For example, the second captured image may be of the right side of the target object. At sub-operation 871C, the first and second distances are compared to determine a difference between the distances. At sub-operation 871D, a determination is made as to whether an error relating to the locations of the marker(s) in either captured image exists based on whether the difference between the distances exceeds a permitted difference.

Attention is returned to FIG. 2. At operation 280, the user device 120 transmits the determined distance(s) to the backend system 110. At operation 290, the user device 120 receives information based on the determined distance(s). At operation 299, the user device 120 obtains user input based on the information.

Attention is now drawn to FIGS. 9A and 9B, which each depict different planar orientations of a target objection with respect to a plane of a mirror 910.

FIG. 9A depicts a target object orientation plane that is substantially parallel with the plane of the mirror 910. As shown, two perceived distances between a central feature 925 (e.g., nose or chin) of a center 920 (e.g., a head) and respective outer edges 930 and 940 (e.g., shoulders) of the target object are within an acceptable amount of difference.

FIG. 9B, by comparison, depicts a target object orientation plane that is not substantially parallel with the plane of the mirror 910. As shown, two perceived distances between the central feature 925 and the respective outer edges 930 and 940 of the target object are not within an acceptable amount of difference. For example, if a user were to turn his or her right shoulder (e.g., outer edge 940) away from the mirror 910, and then turn his or her head (e.g., center 920) so the plane of his or her face is substantially aligned with the plane of the mirror 910, the distance between the user's left shoulder (e.g., outer edge 930) and the user's face (e.g., a central feature 925 like a nose, chin, mouth, eyes, etc.) would be shorter than the distance between the user's right shoulder and the user's face.

Attention is now drawn to FIG. 21, which depicts a computer-implemented methodology for determining measurements of a 3-dimensional object (e.g., a human body). As indicated by FIG. 21, a combination of images and user input may be used to compute 3-dimensional measurements from the 2-dimensional images. The 3-dimensional measurements may be calculated by taking at least two images in two different perspectives (e.g., a front view and a side view), and by including a reference object in those images to enable calibration and correlation of dimensions. Images may be captured in the reflection of a mirror so that the camera device (e.g., smart phone, tablet, camera) capturing the images may be used as the reference object.

In one such implementation, at operation 2110, a user is instructed to stand facing a mirror with the camera device positioned so that minimal outer dimensions of the camera device are obstructed in the reflected image in the mirror. The trunk of the user's body should also be generally free from obstruction in the reflected image. The user may then capture the front view image using the camera device. It is preferred that the camera device be oriented where its outer dimensions are parallel to horizontal and vertical planes. In some cases, it is preferred that the longest dimension is oriented along the vertical plane, while in other cases it is preferred that the longest dimension is oriented along the horizontal plane.

At operation 2120, other images are captured using a similar approach to that specified for operation 2110. For example, the user may stand with the user's side view reflected in the mirror and capture a second image. Additional images may be captured to improve accuracy of the measurements or to capture additional measurements from different angles or from different distances away from the mirror.

At operation 2130, the user may then be prompted to identify the general location of particular reference points on the user's body, and may further be prompted to identify the general location of particular reference points on the reference object. Preferably, these locations are identified via a touchscreen interface of the camera device, where the user sets the general locations "on" the images.

Comparisons may be made of vertical coordinates for corresponding parts of the body (e.g., overbust point on left side of body and overbust point on right side of the body) to determine user error in setting the corresponding locations of reference points relating to overbust of the body. If the vertical components differ beyond an acceptable range of pixels, then the user may be instructed to reset the locations of the reference points.

Alternatively, the reference points of the body may be automatically detected without user select using various techniques described herein.

Various reference points are contemplated, including overbust and underbust lines corresponding to the body, and further including outer edges of the camera device or diagonal points from corners of the camera device in.

Once the user identifies the general location of the reference points, additional points may be automatically generated and provided to the user so the user can adjust those generated points to improve accuracy. For example, reference points for one part of the body may be used to estimate reference points on the opposite side of the body in the image.

Once images have been captured and the user has identified the desired points in each of the images, each of the images may be further processed to calculate desired measurements. In one implementation, at operation 2140, the captured images and user-selected points are used to determine a region of interest (ROI). For example, a predefined number of pixels around pixels designated by the reference point may be used to determine the boundaries of the ROI. Alternatively, the ROI may be detected by analyzing the image for differences among neighboring pixels, and then set the ROI to include pixels near those differences. The user may be provided with instructions to place additional markers to indicate the location of certain points of the body within the region of interest to aid in determining the background and foreground of the image.

By way of example, FIG. 19A depicts a front view of an upper torso of a woman's body having a body contour 1973a. Two regions of interest (ROI) 1970a are shown. Similarly, FIG. 19B depicts a side view of the upper torso of the woman's body having a body contour 1973b. Two ROIs 1970b are also shown. Aspects relating to RIOs 1970 are described below and elsewhere herein.

FIG. 20A depicts a ROI 2070a. The ROI 2070a may then be processed to determine a background 2072a and foreground 2071a of the image, which are separated by a body contour 2073a. The foreground 2071a of the image corresponds to the trunk of the body and the background 2072a of the image corresponds to an area of the ROI 2070a behind the user's body. Processing to determine additional layers beyond the background 2072a and the foreground 2071a is also contemplated, but not shown.

Under circumstances where color and/or light contrast between the foreground (e.g., a shirt) and background (e.g., a wall color) is sufficiently different and relatively uniform throughout the image (e.g., absence of shadowing due to a light source coming from one side of the image), the ROIs may be automatically detected, or the user may be asked to only identify locations of reference points on one side. In the case where the user may be asked to only identify locations of reference points corresponding to one side of the user's body, those reference points may be used to identify reference points on the other side of the body. Accordingly, characteristics used to determine an ROI on one side of the body may be used to determine another ROI on the other side of the body. If locations of reference points are automatically generated, the user may be instructed to adjust those reference points if inaccurate. Reference markers may be initially placed on the image based on similar analysis of the image to enable the user to move those markers to a desired location more quickly. In some embodiments, reference points are not used, and boundaries are simply detected based on difference between foreground and background.

Reference is made to FIG. 20B, which depicts an estimated boundary 2074b corresponding to the body contour 2073b. At operation 2150, an image segmentation methodology may be applied to learn about the nature of the pixels in the background 2072b and foreground 2071b, or generally in the ROI 2070b. By way of example, the image segmentation methodology may identify a list of pixels in the foreground 2071b and the background 2072b, learn about characteristics of those pixels, and then mark the estimated boundary 2074b between the foreground and background using the differences between their learned characteristics. As shown, for purposes of illustration only, the estimated boundary 2074b may not perfectly align with the body contour 2073b. In certain circumstances, a margin of error between the estimated boundary 2074b and the body contour 2073b may be acceptable within X units of measurement, where X can be any number.

In one implementation, the image segmentation methodology identifies similarities and differences of characteristics among neighboring pixels. One such methodology may be a graph-based methodology to determine the estimated boundary 2074b of the foreground and background pixels, but any methodology for determining the estimated boundary 2074b of foreground and background pixels known in the art may be used or modified for use. The image segmentation methodology may also use Gaussian Mixture Models (GMM) to model the color of the foreground and background pixels separately. The methodology may also use a Graph-Cut technique to partition the foreground and background by comparing the similarities of the neighboring pixels and finding the region with the greatest amount of dissimilarities.

Factors such as color gradients and compatibility with existing GMM foreground and background models may be used to determine the segmentation. The GMM and Graph-Cut techniques are provided merely as illustrative examples, and image segmentation may be applied using any method or combination of methods known in the art.

At operation 2160, the estimated boundary 2074b may be refined to more closely match the body contour 2073b in the image to remove outlier image segments in order to smooth the estimated boundary 2074b that indicates the estimated contour of the body in the particular ROI 2070b of the image. In this operation, the largest contour of the segmented image may be considered to represent the left and right body outlines of the user. The left and right sides of the image may be then refined using smoothing operations to remove noise contours caused by loose fitting clothing or foreground/background similarities. Additional comparisons may be made between boundaries of two corresponding ROIs based on symmetry expectations (e.g., where each boundary is expected to generally follow a similar mirrored contour.

The locations of reference points that the user initially selected to indicate a body part (e.g., the overbust and underbust lines) may be refined (e.g., moved) to closer match the actual contours of the body and reduce user errors relating to the setting of reference markers on the captured images. In each image, pairs of reference points (e.g., one reference point from left contour and one reference from the right contour) may be determined to define an overbust line and an underbust line. For example, pairs of reference points that are furthest away from each other may designate the overbust, while pairs of reference points that are closest to each other may designate the underbust.

At operation 2170, segmentation and contour refinement operations 2150 and 2160 are repeated for each ROI. Learned information from performance of operations 2150 and 2160 on other ROIs may be used at operation 2170 for other ROIs. Moreover, any additional information learned from operation 2170 may be used to refine the segmentation and contour refinements of previously-analyzed ROIs.

Similar operations are performed for the reference object (e.g., a smart phone with camera). For example, one or more ROIs may be determined for the reference object, which has known physical dimensions. The user may be provided instructions at operation 2130 to set reference points (e.g., two points indicating two opposite corners of the device). One example of reference points 2215 are shown in FIG. 22. Additional reference points 2217 may be automatically determined based on the property of a rectangle (e.g., using the x and y coordinates of each reference point 2215, where the reference points 2215 have coordinate pairs x1, y1 and x2, y2, and coordinates from those pairs are used to derive the additional reference points 2217 with coordinate pairs x1, y2 and x2, y1). An initial outline 2219 may be determined based on the reference points 2215 and 2217. The initial outline 2219 may be used to determine the ROI(s) 2270 in operation 2140. Alternatively, the initial outline 2219 may be used to select pixels for the segmentation analysis of operation 2150 without determining an ROI 2270.

At operation 2150, foreground and background pixels are identified (e.g., using a narrow strip of a predefined number of pixels around the initial outline 2219, such as those corresponding to the ROIs 2270). Accordingly, the foreground corresponds to the reference object, and the background corresponds to other objects behind the reference object in 3-dimensional space. Use of an ROI or narrow strip of pixels of a sufficient size may account for errors introduced by occlusions like fingers along the initial outline 2219.

Once the foreground has been segmented, a boundary 2374 (FIG. 23) associated with the contour 2373 of the reference object may be refined in operation 2160. Because the dimensions of the device may be known, straight lines may be applied to the largest contour of the device to remove any smaller inaccurate contours for accurate determination of the outside dimensions of the device in each image.

At operation 2180, the relationship between the number of pixels separating refined reference points (e.g., the overbust and underbust lines) may be correlated to known physical dimensions (e.g., the known dimensions of the reference object) to determine the physical dimensions corresponding to those reference points (e.g., the actual overbust and underbust dimensions). For example, a scaling factor may be determined by relating the number of pixels between two opposition contour points of the reference object to known physical dimensions of the reference object that correspond to those contour points.

This scaling factor (e.g., in terms of physical dimensions over number of pixels) may then be applied at operation 2195 to the number of pixels corresponding to refined reference point pairs of interests to determine the actual dimension of that body feature designated by the reference points of interest (e.g., overbust or underbust). This may be achieved by taking the number of pixels between the two points, and then multiplying the result by the scaling factor to determine the corresponding physical measurement.

Those skilled in the art may appreciate that the above steps may or may not be required for each image being processed and any one of these steps may be eliminated or repeated as necessary to achieve the desired result.

Attention is now drawn to FIG. 24, which depicts a computer-implemented image segmentation methodology for determining separation between two image regions (e.g., background and foreground). The image segmentation methodology may relate to, for example, operation 2150 of FIG. 21, and may be applied during processing of the target object and the reference object.

The segmentation methodology of FIG. 24 determines the best separation of two image regions by a curve, and can be used to determine an estimated boundary corresponding to the body contour of a person and the structure contour of a phone. An output of the segmentation methodology of FIG. 24 may be a curve that is further refined by the additional contour refinement methodologies described elsewhere in this disclosure. The segmentation methodology may initially determine an area of the image to process based on the markers set by a user when that user is asked to designate where the body or structural contours are in the image. If a marker is placed, the segmentation methodology may individually process an area on one side of a marker (e.g., foreground 2071 of FIG. 20), and also process an area on another side of the marker (e.g., background 2072 of FIG. 20) to determine representative color values for those areas. However, the segmentation methodology may be carried out without consideration of the markers, where the processed areas are discovered by image color analysis, or another method for detecting regions on different sides of a target contour (e.g., so as to form the foreground and background model).

As shown in operation 2410, a system component may compute color-normalized histograms for each area (also referred to as a "class") on opposite sides of markers placed by users. An example histogram is shown in FIG. 25, which may represent values for the foreground or the background. As shown, the exemplary histogram charts numbers of pixels that fall within various ranges of color values. Each range of color values are referred to as a "bin". The size of bins may be adjustable depending on various factors, including low contrast between foreground and background, needed processing speed, and other factors. The histogram in FIG. 25 illustrates five bins of equal size (e.g., 5 color values), and also illustrates that the number of pixels per bin can vary. The bins may be used to quantize a range of color values to a single representative color value for the members of the bin.

The histogram of FIG. 25 further illustrates a "weighting window" that assigns more weight to color values that are centered in the bin and less weight to color values near borders of a bin. In one implementation, the weighting may be directly proportional to the distance between a color value from the center color value of a bin. The weighting window may operate to weigh the contributions of pixels inside the bin and immediately outside the bin of interest. Resulting histograms may be normalized such that the sum of all bins sums to one.

At operation 2420, a system component computes the likelihood of whether a pixel in a segmentation area (e.g., the white space designated by 2075*a* between the foreground 2071*a* and background 2072*a* areas within a region of interest 2070*a* of FIG. 20A) belongs to one of the classes/areas (e.g., the background 2072*a* or foreground 2071*a*). The color value of each pixel to be segmented (e.g., in segmentation area 2075*a*) may be compared to color values in each of the foreground and background histograms obtained at operation 2410. For each pixel, a system component may compute a probability of whether that pixel belongs to the foreground and background. In one implementation, two probabilities are computed for each pixel—a probability that the pixel is a foreground pixel and another probability that the pixel is a background pixel. A pixel is then assigned to either the foreground or background depending on the maximum probability value. If the probability that the pixel belongs to the background is higher than the probability that the pixel belongs to the foreground, then the pixel will be assigned to background. Otherwise, it will be assigned to foreground. Of course, the alternative is true, when the probability that the pixel belongs to the background is lower than the probability that the pixel belongs to the foreground, then the pixel will be assigned to foreground or otherwise assigned to background.

At operation 2430, a system component determines which pixel in each pixel row of the image best fits expected color characteristics associated with an object's contour. In one implementation, a system component computes the likelihood of whether the pixel falls along the object's contour by summing together the likelihood that pixel(s) to its left belong to one class and pixel(s) to its right to belong to the other class. The pixel likelihoods may be computed as described in operation 2420. Maximum values of the sum for each pixel in a row may be compared to determine which of the pixels fits expected color characteristics associated with an object's contour.

At operation 2440, analysis of pixel rows depicted in operation 2430 is repeated for each row of the segmentation area. The collection of one pixel per row forms an estimated boundary of the object's contour (e.g., estimated boundary 2074*b* of FIG. 20B). Additional refinement of the estimated boundary may be performed as described below and elsewhere herein (e.g., operation 2160 of FIG. 21). Such refinement may result in reassignment of a pixel to a particular class and/or to the estimated boundary.

Various refinement methodologies are described below.

In a spline method of refinement, a system component may determine a "contour score matrix" that contains probabilities of an object's contour passing through each pixel in a selected area of an image. Each row in the matrix corresponds to a given row of pixels in the image, and each probability score in a row corresponds to a pixel of the row. In one implementation, the sum of scores for each row may be unity.

Once the contour score matrix is defined, the pixel associated with the maximum probability score may be initially selected as the pixel that most-likely falls on the object's contour. Alternatively, a pixel may be selected from operation 2430, and a matrix may then be defined. A system component may then calculate a modal variance as the average squared deviation from the selected pixel. Thus, for each row some embodiments have an initial point and a corresponding error given by the square root of the modal variance. These points and errors are then used to calculate a smoothing spline (e.g., using a methodology proposed by Reinsch). By way of example, FIG. 26 depicts a graph of contour scores for different pixels in different rows.

A Viterbi method of refinement may be used to smooth an initial estimated boundary to account for vertically adjacent pixels along an initial estimated boundary that have significant horizontal variations from each other (e.g., as shown by estimated boundary 2074*b* of FIG. 20B). Such refinement is needed to smooth the estimated boundary so it better aligns with the contour. The Viterbi algorithm may be used to provide a smoothness constraint to determine the best path of pixels from a top of an estimated boundary to a bottom of the estimated boundary given by a transition probability. The transition probability applies greater weight to smaller horizontal transitions and applies less weight to larger horizontal variations from pixel to pixel in consecutive rows.

In some cases, the shape of an object is known. For instance, a reference object like a phone with a camera may have a known shape and dimensions. The shape and dimensions may be used to refine an initial estimated boundary of that reference object.

Attention is now drawn to FIG. 27, which depicts a computer-implemented methodology for estimating an object's shape, and for using the estimate to generate or refine estimated boundaries associated with the structural contour of that object.

At operation 2710, a system component computes, looks up or otherwise determines the dimensions of an expected shape of the object. In order to find the location of the object's contour, background and foreground areas of an image may be initialized from a user's markers. A segmentation methodology (e.g. the methodology described earlier and illustrated in FIG. 23) may be used to estimate the contour of the object as a boundary between the object in the foreground and the background. Since a user takes an image of the object (e.g., a phone with a camera) in a mirror, the object may have an expected shape (e.g., a rectangle and rectangle with rounded corners).

Under circumstances where the object is held in place by a user, the initial estimated boundary resulting from the segmentation could be affected by partial object occlusion caused by a user's fingers or clothes or other object in front of the object. The estimated boundary could also be notched due to noise and blurring of the input image.

At operation 2720, the size and location of the known shape is varied in order to find the size and location that best fits the estimated boundary. In one implementation, it is sufficient to vary only three parameters to cover all possible deformations: (i) transformation along the X axis; (ii) transformation along the Y axis; and (iii) scale factor. An average value of distances along a two-dimensional (X, Y) plane from each point on the shape to the nearest pixel on the estimated boundary may be used as fitting optimization measure.

A distance map like that shown in FIG. 28 may be used to calculate the distance from a point on the shape to the nearest pixel on the estimated boundary. Each point/pixel pairing of the distance map contains a penalty based on distances between points on the shape and pixels on the estimated boundary. Larger distances may receive a greater penalty than smaller distances. Penalty values may be linear to the distance value, or may be otherwise scaled.

An integral image of the distance map may be calculated for the estimated boundary. The resulting distance sum is divided by the number of points on the shape to provide an optimization measure that should be minimized. Alternatively, the number of points may be divided by the sum to provide an optimization measure that should be maximized. The search of the optimal rectangle could be performed using either an exhaustive search of all possible rectangle locations and sizes or as a downhill simplex search for possible shape coordinates and size scale. FIG. 29 depicts a "best-fit" shape in relation to an estimated boundary.

The segmentation of the estimated boundary, as well as selection of the correct shape location, could be affected by the noise caused by environmental effects in addition to partial occlusion of the object by another object (e.g., a user's fingers and/or clothes).

At operation 2730, a system component computes a confidence measure that indicates the quality of the fitted shape as it relates to the estimated boundary. The confidence measure may be computed as measure of displacement between the estimated boundary and the shape. The confidence measure may indicate higher quality for closer estimated boundary pixels and shape points. The location and size of a shape is considered acceptable if the shape and estimated boundary coincide with little or no deviation from each other on a point-by-pixel basis or an aggregate points-by-pixels basis. In case there are differences between points and pixels, the confidence measure is evaluated as a normalized distance between estimated boundary pixels and nearest rectangle points over the whole detected estimated boundary. An estimated value may be extracted from 1.0, and the resulting number is assumed to be the confidence measure, where the ideal confidence measure shall correspond to 1, and the worst confidence measure shall correspond to 0).

FIG. 30 illustrates an acceptable confidence measure for one implementation. The figure shows small distances between points on the shape (designated by the rectangle) and pixels on the estimated boundary (designated by the curving border). In this case, the confidence measure is high, which means that the detected rectangle is detected within threshold accuracy.

FIG. 31 illustrates an unacceptable confidence measure for one implementation. The figure shows large distances between certain points on the shape (designated by the rectangle) and pixels on the estimated boundary (designated by the curving border). In this case, the confidence measure is low, which means that the detected rectangle is not detected within threshold accuracy, or that the pixels of the estimated boundary corresponding to the large distances are inaccurate.

The confidence measure value could be used to detect images which are impossible to process precisely. Under circumstances where the confidence value is too small, the detection result is likely poor since either the shape is located too far from the estimated boundary, or the estimated boundary itself is too noisy or is not aligned with the object's contour. In either case, additional refinement of the estimated boundary may be necessary to permit use of the boundary as a size reference.

Under some circumstances, the estimated boundary of an object's contour will be noisy and jagged. The noise arises from various sources such as imprecise segmentation, movement of the object during image capture, low color contrast between background and foreground, occlusion, and other factors. Smoothing of an estimated boundary is possible when the shape of the object is known. For example, many mobile phones are rectangles with rounded corners. Hence, sides of the estimated boundary must be perfectly straight (or follow a known profile).

At operation 2740, sections of an estimated boundary are refined based on known dimensions and shape of the object. The estimated boundary may be comprised of several sections, where certain sections may be associated with noise (e.g., occlusion of the object contour, and other reasons), and other sections may be more aligned with the actual contour of the object. A system component (e.g. a processor) may determine which of the segments best align with the actual contour of the object, and then discard the remaining segments (e.g., as noise). One method for determining which of the segments best align with the actual contour is to assume that the longest sections best represent the object's contour. An alternative method may adopt the assumption that segments with shared characteristics most-likely represent the contour (e.g., those segments with a certain percentage of pixels that fall within the same range of horizontal or vertical pixel values). In this manner, outlier segments can be detected and ignored.

Once the selected segment(s) of the estimated boundary are determined, a bounding list of points on all four sides of the object may be generated. The bounding list corresponds to the points on the object's contour that lie between two outermost bounding points—e.g., two corners where the object is a rectangle, projected corners where the object has rounded corners, or points where the rounded corners start. In the case where the object has rounded corners, a heuristic may be used to determine a distance from the point where the rounded corners start to the projected corner.

Once two outermost bounding points for each side are determined, points that lie between those outermost bounding points are considered. In one implementation, consideration may be given to only those points that are within a threshold distance from the line connecting the two user markers for that side. A heuristic measure may be used to set this threshold. Points that fall outside of the threshold distance may be ignored or weighted as less accurate.

For each bounding list of points (e.g., one for each of the 4 sides of a rectangle), a histogram of x or y coordinates is computed depending on whether the side corresponds to a vertical line or a horizontal line. In the case of a vertical line, consideration is given to x coordinates since it is desired to have x coordinates of all points on the vertical line to be as close as possible. The y coordinates of points on a vertical line vary uniformly, as expected. The same is true for horizontal lines, and y and x coordinates, respectively. Bins of various sizes may be used to construct the histograms depending on the implementation. The mode of the distribution is then selected in order to determine the x or y coordinate that best represents that side. The mode of the distribution corresponds to the bin with the maximum number of points. This process is repeated for all sides to determine two x-coordinates for the two vertical lines and two y-coordinates for the two horizontal lines. These coordinates are used to construct four points that would correspond to the four corners of a rectangle (e.g., where they represent the corners, or where they are adjusted by the distance to the projected corner to determine the projected corner). The result is a refined contour that can be used to calibrate measurements.

Figure 34A:
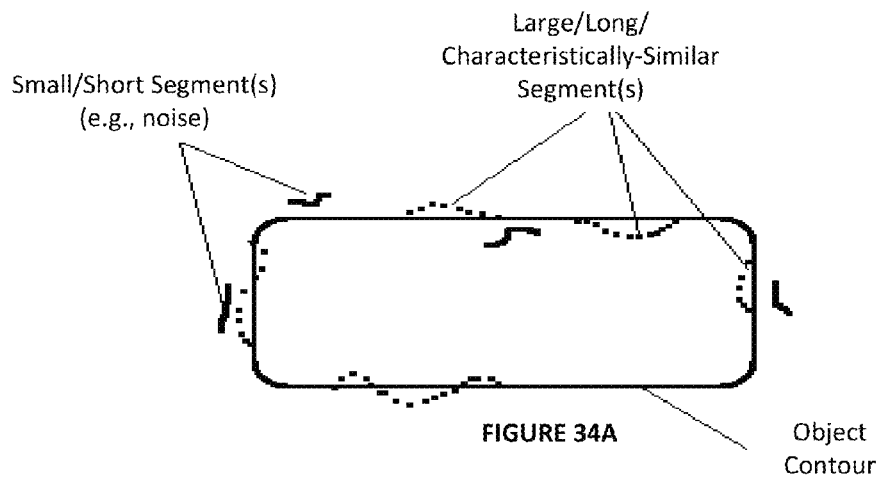
Figure 34B:
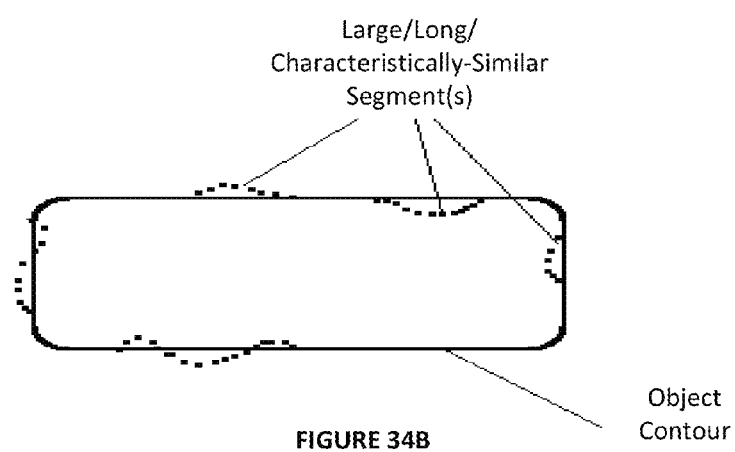

As shown in FIG. 34A, shorter segments or segments that are not characteristically similar to other segments may arise due to noise, and longer or characteristically-similar segments may be identified (e.g., as having points that fall within expected ranges of x and y coordinates). The shorter segments may be ignored, and longer or characteristically-similar segments may be considered as shown in FIG. 34B, where considered segment(s) are shown by the dotted lines. The dotted lines may be segmented or may be connected along a dotted line (not shown) that overlaps with the solid line specifying the object's contour.

Figure 34C:
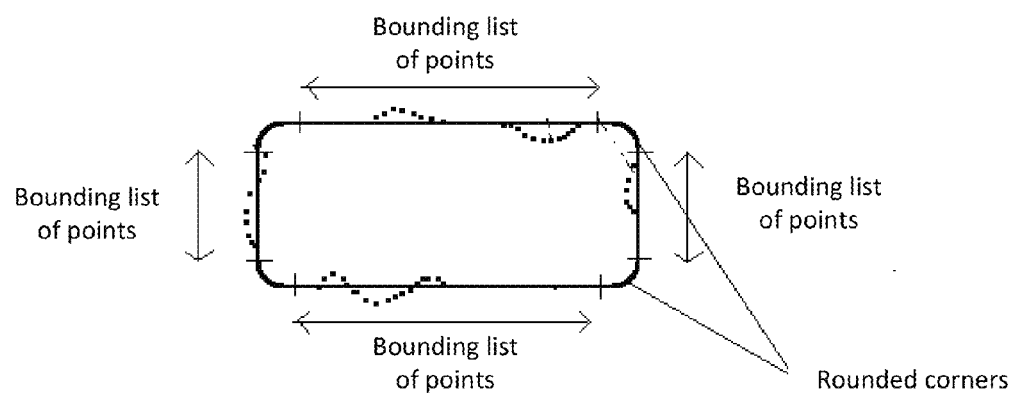

In one implementation, an estimate of the object's contour is made using the dotted estimated boundary segment(s). In order to determine the actual object's contour, portions of the dotted boundary that correspond to the rounded corners of the object may be ignored or considered. FIG. 34C, for example, illustrates an implementation where such portions are ignored.

It is assumed that the points between the rounded portions lie on a straight line, which is one reason a bounding list of points is selected. Once the bounding lists of points are determined for all four sides, an estimate of the underlying straight lines is made. In one implementation, localized noise in the dotted line may be detected and ignored. For example, points on the dotted line fall outside a threshold border as shown in FIG. 34D may be ignored. The threshold border may be determined as an offset from a corresponding line (not shown) that connects user markers, or from a threshold percentage of points along the dotted line, or by way of another approach.

In order to detect circumstances that might lead to erroneous measurements, a color contrast check may be performed to determine the integrity of the background and foreground models (e.g., as represented by the histograms of operation 2410 and as used in other operations of the segmentation methodology of FIG. 24 or other methodologies disclosed herein). Research has indicated that, of different color spaces, YUV color space provides the best measure for detecting if the background and foreground are too similar in terms of color contrast. Results, for example, on a row-by-row basis, may be accepted where the background and foreground areas are separable in at least one of the three Y, U or V channels. Results may be rejected where the difference between background and foreground pixels falls below a predefined threshold in all three channels (e.g., where the threshold for rejection is determined using heuristics).

By way of example, images shown in FIG. 32 and FIG. 33 include user marker points 3299 and 3399 corresponding to an object (e.g., phone), and a refined estimate 3298 and 3398 (dotted line) of the object's contour obtained using certain embodiments described herein. FIG. 32 includes the object (shown in solid lines as a rectangle with rounded corners). FIG. 33 does not include the phone to illustrate the difference between markers 3399 and refined estimate 3398 of the phone's contour. FIG. 33 further illustrates that the refined estimate 3398 can account for inaccurate estimated boundaries (e.g., due to poor color contrast between object and background).

Additional embodiments are described below. The first three sections specify different embodiments related to the sizing technology discussed elsewhere herein. The fourth section describes embodiments that capture images using adaptive feedback that helps align the camera/phone, which leads to better images of the user. The fifth section describes embodiments that estimate size of body parts using 3D body models.

The first three sections are designated as follows: (1) Coin Method; (2) Pattern Detection Method; and (3) Odometry Method. Each of these methods attempts to ease the posturing requirements for users to enable accurate detection of contours and estimates of dimensions. Loosening posturing requirements permits variations among postures by different users who use the sizing technology, and can obtain accurate sizing information despite differences in user postures away from an ideal posture.

Coin Method

Coin methods can be carried out without using a mirror. A coin (e.g., a quarter), or other reference object of known dimensions, may be used instead of the image capturing device (e.g., phone). Since in certain embodiments, 3D measurements are being determined using 2D images, at least two images in two different perspectives are captured. For example, a substantially front view image and a substantially side view image of the user may be captured. A reference object may be used to relate the pixel measurements to real world measurements. Hence, the coin is captured in the images as the reference object.

"Substantially" may include any percentage of true front or side view that leads to determination of body dimensions within an acceptable amount of distance error. For example, "substantially" may include 90-100% of the true front or the true side view. Different embodiments may require a greater percentage than 90% depending on the difference in clothing sizes offered to users. Where the difference between sizes differ by large amounts (e.g., waist sizes differ by 2 inches), a smaller percentage may be acceptable; however, where sizes differ by small amounts (e.g., waist size differs by less than 1 inch), then a larger percentage may be required so that a more accurate estimate of dimensions is obtained.

Some coin methods may include the following operations: (1) Camera/phone is placed on a table or other surface; (2) User steps away from the camera/phone; (3) User holds a reference object (e.g., coin) next to the user's body (e.g., next to user's breast); and (4) Camera/phone takes picture of reference object and portion of user's body at a first orientation (e.g., front view). At operation (4), the picture may be captured after some event, including a predetermined time period, upon detecting the body is in focus, upon detecting a gesture from the user (e.g., hand wave, other movement), upon detecting a voice command from user, or upon detecting that the user has stopped moving or has reduced his/her movement over time. Operations (1)-(4), or (3)-(4) may be repeated for other body orientations (e.g., side view). For example, the camera/phone may instruct the user to turn, or the user may reset the camera/phone to capture the image of the latest body orientation. By way of example, FIG. 35 depicts operations for measurement estimations using a coin method.

Pattern Detection Method

Pattern detection methods use a mirror and a reference object that includes an image/pattern displayed on a screen of a phone placed adjacent to or near a body part of interest. The reference object displayed on the screen may comprise any number dimensions, patterns and colors that may result in better boundary detection (e.g., as compared to detecting boundaries of the phone itself). Some pattern detection methods may include the following operations: (1) User holds or otherwise places the phone adjacent to the user's body with the display of the phone facing a mirror; (2) Phone displays a pattern on its screen (e.g., a chessboard image, or other image); and (3) Phone uses its front camera to take a picture of the mirror, which reflects a portion of the user's body (e.g., user's breast) as well as the image on the screen of the phone. Operations (1)-(3) or operation (3) may be repeated for various user orientations (e.g., front view, side view, and other views). Image capture at operation (3) may be accomplished upon user activation of the phone's camera, or automatically upon detection of some event (e.g., time period expires, user is in focus, little or no user movement is detected, other events). By way of example, FIG. 36 depicts operations for measurement estimations using a pattern detection method.

Odometry Method

Odometry methods may compute size of user body parts with or without capturing images of that body part. Some odometry methods may include the following operations: (1) User moves phone along surface of body part (e.g., circumference or other dimension of breast, overbust, underbust, or dimension of other body part); (2) As phone moves, phone captures pictures of environmental surroundings; (3) The distance traveled by the phone, and the shape of the path traveled, may be computed using the captured images and sensor measurements from an accelerometer and/or gyroscope. For example, the distance traveled by the phone may be determined by analyzing the continuity between successive images, and then using this information in tandem with the information from the accelerometer to compute the final distance traveled.

Computation of the distance traveled may be carried out by different approaches. One approach captures one or more images per each discrete time interval, such as one image per n second(s). After an image is captured, prominent feature points may be extracted. It is contemplated that known computer vision algorithms may be used for such feature extraction. For example, use of Harris corner features provides optimal speed and accuracy in some embodiments.

Multiple images are processed to identify common features. For instance, a feature (e.g., all or a portion of a physical object, including a point on an object) depicted in two or more successive image may be identified to determine scene overlap of those images (where the feature appears in different positions in those images. Matching features in two successive images leads to an estimation of the amount of movement between those two images.

Motion between every two successive frames may be estimated using the matched features. Motion estimation can also be achieved by known standard computer vision algorithms (e.g., point set registration methods). Motion estimation can be determined from the camera images if a reference object of known dimensions is captured. However, where no reference object is captured, camera motion may be associated to real world physical measurements using accelerometer and gyroscope data from camera/phone device. For example, an accelerometer provides information about linear motion of the device, and a gyroscope provides information about the rotation of the device. One way to normalize the motion parameters from multiple sensors (camera, accelerometer and gyroscope) is by correlating the data obtained from these sensors.

In at least one embodiment, motion may be estimated by estimating the pose (e.g., position and orientation) of a device equipped with both a camera and one or more inertial measurement units (IMU) (e.g., accelerometer, gyroscope, and the like). Such a device may be a smart phone or other device. An IMU coordinate frame {I} may be determined, and the motion of the device may be tracked with respect to a fixed global coordinate frame, {G}. The global coordinate frame refers to the real world where the measurements are to be made. The spatial transformation between the IMU coordinate frame and a coordinate frame of the camera is constant and may be known from prior calibration. A transformation may be described by a rotation quaternion and a position vector. Intrinsic parameters of the camera are available from an offline calibration procedure.

Motion estimation in unknown environments is desired. Thus, it may be assumed that the camera observes naturally-occurring visual features at positions that are not known beforehand. Visual measurements from the camera are fused with measurements from a 3-axis gyroscope and a 3-axis accelerometer, which provide measurements of the rotational velocity and acceleration. One thing to note is that the distance traveled may be given by the double integral of the acceleration vector, or by the single integral of the velocity vector. The approach to motion estimation is based on multi-state-constraint Kalman filter (MSCKF). Under one implementation of the MSCKF method, a state vector comprising a sliding window of camera poses is maintained, and the feature measurements are used to impose constraints on the poses, without explicitly including the features in the state vector. The state vector consists of the current IMU state (e.g., accelerometer and gyroscope states) and the camera poses at time instants when the last m images were taken. The camera pose estimation may be accomplished using the feature extraction and feature matching. Standardized computer vision algorithms known in the art may be used for pose estimation. Hence, the state vector includes data from accelerometer, gyroscope and the camera. This state vector is the building block to a final estimate of the distance traveled by the device.

The state vector is a combination of IMU state and the camera state. The IMU state is defined as the vector consisting of unit quaternion describing the rotation between global frame and IMU frame, and the position and velocity of IMU frame with respect to the global frame. Every time a new IMU reading is received, a covariance matrix of the state estimate is updated. The covariance matrix assists the modeling of the propagation of the device state. It is a matrix formed by combining an error-state transition matrix (e.g., to keep track of any errors introduced), IMU state matrix partitions (e.g., in some cases, the way in which covariance matrices are formed are by taking partitions), the camera poses and the cross terms between them. Every time a new image is received, the state vector of the filter is augmented with a copy of the current camera pose.

By way of example, a new image is captured every n seconds. A new state is initialized using the captured image along with the current accelerometer and gyroscope readings. Once the features are extracted from the current image, an update to a filter is performed using all the features that have been matched. To make it more robust, all the features from the previous m images are considered. In some cases, the modeling process is not started until the mth image is captured. Old camera states may be removed (e.g., the last one in the list of those 'm' images), and the current camera state is added. An updated state vector is obtained, and a covariance matrix is obtained using the accelerometer and gyroscope readings. Where using the integral of a vector is not computationally tractable, constant linear and rotational velocity is assumed for the device. Thus, distance traveled may become a simple time multiplier (velocity=distance traveled/time taken). Since this approximation is for a short time interval, precision meets acceptable amounts of error.

In order to increase the accuracy of the estimated distance, the user may be directed to follow some of the steps above when standing in front of a screen that displays a pattern of known dimensions (e.g., a reference object). The pattern is captured in each image while the user moves the phone. Feature points of the pattern may be matched across images, and the camera pose may be accurately estimated in each image. In this scenario, the data from the accelerometer and gyroscope may not be needed to compute the final distance traveled since the dimensions of the reference object are known. Instead, the image, accelerometer and gyroscope data may be correlated to obtain increased accuracy of the estimate of distance traveled.

Phone Alignment

Phone alignment methods relate to educating the user to align the phone along a desired plane. As described elsewhere herein, sizing technology allows the user to take two or more photos with a phone to generate measurements of body parts (e.g., overbust and underbust measurements). The user's body contour is estimated, and the estimation is used to compute sizing measurements for fitting of clothing. Preferably, a user holds the front of the phone substantially parallel to the plane of the mirror (e.g., along X and Y axes in FIG. 37), and with a bottom side substantially parallel to the ground plane (e.g., along Z and X axes in FIG. 37). "Substantially parallel" may include perfectly parallel and other orientations that are near parallel (e.g., within x % of parallel).

As demonstrated by FIG. 38A and FIG. 38B, some embodiments may cause the phone to display two images relating to the front of the phone, and two images relating to a side of the phone before image capture. As shown, one image in each pair (e.g., the solid color) is static and used to represent the desired orientation of the phone to ensure capture of a usable image. The other image in each pair (e.g., the animation of the phone with "ThirdLove") moves when the user moves the phone so the user can see that the phone is not aligned with the static image (and hence, not aligned with the ground or the mirror planes within a tolerated amount of distance).

Determining the orientation of the phone and its direction of movement may be achieved using sensors in the phone (e.g., accelerometers, gyroscopes), and knowledge of its previous orientation. As the phone moves, the client application captures the movement of the phone using an accelerometer and/or other sensor, and translates that movement to motion of the 2D model on the screen for the given part of the phone (front or side). The phone guides the movement of the user to get to the final position.

In at least one embodiment, the orientation of the camera/phone device is determined using a combination of information from an accelerometer and gyroscope on the phone. The accelerometer provides information about the linear motion of the device, and the gyroscope provides information about the rotational motion of the device.

For optimal image capture, one side (e.g., the longer side) of the device should be parallel to the ground plane, or generally/substantially parallel to the ground plane (e.g., within x degrees of parallel, where x may be set to <10 degrees or another number that enables accurate estimation of the dimensions of the device in the image while permitting some offset from parallel). Also, another side (e.g., the side of the phone on which the camera is positioned) of the device should be parallel to the mirror plane, or generally/substantially parallel to that mirror plane. The gyroscope provides information about the offset amounts (e.g., angles) at which the phone is oriented away from the ground and mirror planes. Knowledge of these offset amounts can be used to generate pictures that show current orientation as it relates to desired orientation (e.g., parallel or generally parallel orientation with respect to ground and minor planes). A gyroscope may be calibrated to know when sides of the phones are not generally horizontal or vertical. In some embodiments, static pictures, dynamic animation, and/or dynamic voice instructions are outputted on the device to instruct the user to move the phone towards the desired position. The movements include rotations around up to three axes of interest: (1) an axis perpendicular to the mirror plane (to align one side to be parallel or generally parallel to the ground plane); (2) an axis parallel to the ground plane and parallel to the mirror plane; and (3) an axis parallel to the mirror plane and perpendicular to the ground plane.

Data from the accelerometer may be used to detect jerky motion and generate an instruction that will ask the user to slow or stop movements, since motion during image capture can cause errors in measurement.

Some embodiments capture the phone's motion and translate the motion into voice instructions to correct the position of the phone relative to the ground and mirror planes. The user is educated to align their phone to a desired orientation before taking the picture using two, 2D models of the phone on the phone's screen. One model corresponds to rotation around Z axis (e.g., for aligning with the ground plane) and another model corresponds to rotation around X and/or Y axis (e.g., for aligning with the mirror plane).

As shown in FIG. 38A and FIG. 38B, a phone is initially unaligned (FIG. 38A), and later aligned to within a tolerated distance from an ideal orientation (FIG. 38B). Alternatively, the phone's display may show two copies of any object, or a bubble moving in an animated level for a more realistic and natural user experience. The user's goal is to align the 2D model along the two planes to the final positions. This mechanism improves the amount of time it takes to align the phone for more accurate image capture. Once the phone is aligned within an acceptable error tolerance, the user is notified (e.g., by a sound, vibration, color change on the screen) or the phone automatically takes a picture.

Estimating Size of Body Part Using 3D Body Models

Various embodiments described herein estimate the size of a user's body part using two, 2D pictures to estimate the size of that body part in 3-dimensions. That size may then be used to identify articles of clothing for that user. Other embodiments, as described below, alternatively generate different 3D models of different body parts using different combinations body parameters (e.g., age, height, weight, gender, and the like), where each 3D model corresponds to a unique set of body parameters. Contours corresponding to each 3D model of the body part are estimated and stored, and sizing information for articles of clothing that correspond to the contours of that 3D model are determined and stored for later use. Contours of the user's body part may also be estimated, and then compared to the contours of different 3D models to determine which contours from the different 3D models best fit the estimated contours of the user's body part. Sizing information of the 3D model with contours that best fit the estimated contours of the user's body part may then be used to estimate the size of the user's body part and articles of clothing that fit the user's body part. In some cases, identifying a 3D model with contours that best fit estimated contours of the user's body part will provide more-accurate sizing of the user's body part (e.g., shape, dimensions, and the like) by comparison to using two, 2D images of the body part from different perspectives.

Each 3D model may include a single body part, several body parts, or an entire human body. The 3D models may be based on information received from other users, or based on information about different known body part sizes given particular body parameters. Sizing information may include shape and dimensions of a body part (e.g., overbust, underbust, waist, and other features of a body), location of the body part or other body parts (e.g., belly button relative to underbust), and the like.

FIG. 39 depicts a process flow for a 3D body model comparison method. Particular aspects of FIG. 39 are described below.

3D Models Database 3D body models based on groups of body parameters that correspond to different sizes and shapes of human bodies (or individual body parts) may be stored in a database. The 3D models may specify locations and dimensions of body parts (e.g., belly button, overbust, underbust), and may specify dimensions of body parts corresponding to each group's body parameters. In some cases, modeling the location of a body part (e.g., a belly button) is helpful when the phone is placed at that body part during image capture of the user's body part of interest. Also, modeling the locations and dimensions of underbust and overbust enables a more-accurate estimate of a corresponding bust size.

Clustering

Where many 3D models are available, it may be advantageous to cluster 3D models into groups to reduce the processing time required to identify best-fit contours to the user's contours. Each group may be determined based on clothing sizes associated with each 3D model, where 3D models that relate to a particular bra size (or group of bra sizes) belong to the same group. Alternatively, 3D models may be grouped by type of contour, where contours for each 3D model of a group are similar.

Representative contours may be designated for each group. The representative contours may include the contours of one 3D model of the group, an average of multiple contours from the group, or other otherwise based on one or more contours of the group. For example, an optimization method may be used which maximizes differences between representative contours of different groups.

As will be discussed in further detail below, having groups of 3D models can achieve lower processing times by reducing the number of 3D model contours that are compared to the user's contours.

In one embodiment, groups of 3D models associated with representative contours that are poor matches to the user's contours may be excluded without having to compare contours of each 3D model in that group to the user's contours. Thus, groups of 3D models with representative contours that are better matches to the user's contours may be selected for further analysis without having to analyze non-selected groups of 3D models. When a group is selected for further analysis, contours for 3D models in that group may be compared to the user's contours to determine a best-fit 3D model from the group. Alternatively, contours for 3D models in that group may be compared to the user's contours to determine an average fit across those contours that may be compared to an average fit corresponding to contours of other groups. Sizing information associated with the best-fit group may determine clothing sizes of the user. Alternatively, no additional comparison may be needed between the user's contours and contours of 3D model in a group. Instead, the group with representative contours that best fit the user's contours may be identified as a best-fit group, at which point the sizing information associated with that group may determine clothing sizes of the user.

Prior to the comparison of contours, the modeled contours may be scaled so distance(s) between points on a modeled contour or on two modeled contours are similar to corresponding distance(s) of the user's contours.

Extract the 3D Model Contours

As indicated above, contours for each 3D model are determined. The contours for each 3D model are based on front and side perspectives of the 3D model in order to enable direct comparison of 3D model contours to a user's contours.

In one embodiment, features of body parts may be marked in a similar fashion to how users mark corresponding features of their body parts (e.g., overbust and underbust are identified). Highly accurate markings are possible, where markings are placed at boundaries, or generally near boundaries (e.g., where generally near includes within x distance units, such as one pixel). Contours may then be extracted based on the markings.

In at least one embodiment, 3D contours of the model may be rendered based on predetermined parameters in order to determine boundaries. Starting and ending points on each side of the body (e.g., locations of the overbust and the underbust) are determined based on the markings. Other points may also be determined if needed. The points identify boundaries of the body model, which may be used to compare with estimated boundaries of a user.

Body ROI Selection, Body Segmentation, & Contour Refinement

Embodiments related to determining contours of a user are described elsewhere herein.

Computing a Best Fit Between 3D Model Contour and User Contour

As described above, modeled contours are compared to user contours to identify a 3D model or group of 3D models that best represents the user's body part. That 3D model is then used to identify sizing information for that user (e.g., overbust and underbust measurements, shape of breast).

In one embodiment, searching for the most similar model contour is performed by iterative matching of the user's contour to contours of different models in the database. The iterative matching consists of estimating the similarity level between the user contours and the modeled contour. For example, the measure of similarity may include the mean distance between similar points on the modeled contour and the user's contour. Since the distance between points along the contours may vary from other points along the contours, different approaches may be used to measure a best-fit under unified conditions.

Under one approach, as illustrated by FIGS. 40A-C, the modeled contours and user contours are scaled to overlap each other along specific areas. For example, markers placed by a user that designate an estimated point on a user's contour (e.g., overbust and underbust) may be aligned with similar markers on the modeled contours. Contours may be aligned in such a way as to minimize the distance between corresponding markers of a user contour and a modeled contour. Mean points (e.g., average X and Y coordinates) are estimated for user markers as well as for modeled markers, and the modeled contour is transposed to coincide with the estimated mean points. FIGS. 40A-C (and FIGS. 41A-C) depict solid and dotted lines that correspond to user and modeled contours. Either line may correspond to either type of contour depending on the implementation (e.g., solid line as modeled contour and dotted line as user contour, or solid line as user contour and dotted line as modeled contour). One of skill in the art will understand that the lines are depicted for illustrative purposes. FIG. 40A also depicts four boxes that correspond to marker locations for each contour. The markers for each contour are shown to overlap in FIG. 40A; however, the markers need not overlap, and can instead be near each other.

Under a second approach, the contours are considered in their entirety, and comparison of the modeled contours and the user contours is performed using translation along vertical and horizontal axes to align those contours with each other. The second approach, illustrated by FIGS. 41A-C, seeks an optimal overlap for contours. In one embodiment, either the user or modeled contour is translated along the vertical axis. In order to find the optimal vertical shift, this method calculates, for each pixel row, the distance between left and right user contours, and also between left and right modeled contours. Then, the user or modeled contours are shifted in order to place parts of the user and modeled contours with similar widths on the same row (e.g., by searching for a minimal mean difference the widths). Horizontal shifting is also possible to align pixels of each contour. FIG. 41A and FIG. 41C illustrate vertical shifting relative to dotted contour lines in FIG. 40A and FIG. 40C. FIG. 41A and FIG. 41B illustrate horizontal shifting relative to dotted contour lines in FIG. 40A and FIG. 40B.

In other approaches, an estimation of similarity is measured using points on the user contour and points on the modeled contour, where a mean distance between each user contour point from a corresponding point on a modeled contour is measured (e.g., between points on the same row or column). The smaller the mean distance, the more similarity there is between the user contour and modeled contour. Distances between corresponding points on modeled contours and user contours may be calculated using a distance map.

A penalty is assigned to each pixel on the user contour that does not overlap a corresponding pixel on the modeled contour. Larger errors are assigned for larger distances between corresponding pixels on the user contour and the modeled contour. For example, overlapping pixels are assigned a penalty of 0, a one-pixel offset (e.g., neighboring pixels) have a penalty of 1, and an n-pixel offset has a penalty of n. Some embodiments iterate through locations of selected points on a user's contour, determine its distance to the nearest point on the modeled contour, assign a penalty to each point, and then select a modeled contour with a low (or lowest) penalty value. The penalty value may be an average penalty across the points, a summation of the penalty values, or some other value.

User Interfaces

FIG. 10 depicts a user device 120, on which various features of user interfaces depicted in FIGS. 11-20 may operate. As shown, the user device 120 includes a display/touchscreen 1005 for graphical user interfaces and for receiving a user's touch inputs. The user device 120 further includes software modules in memory 1006 for carrying out functionality associated with the graphical user interface, and also includes network interfaces 1002 for web connectivity. One of skill in the art may appreciate that other user devices may be used, including personal computers like laptop, tablet and desktop computers with similar components to those shown in FIG. 10.

FIG. 11 depicts a user interface ("UI") 1100. The UI depicted in FIG. 11 may take various configurations and may perform various functions within the scope and spirit of the disclosure. For example, the disclosed UI 1100 may include a displayed representation of a target object (e.g., a section of the user's body) and a reference object (e.g., the user device 120). The UI 1100 may also include instructions (e.g., "And now turn to your left . . . ."), an icon for taking a photo (e.g., "take photo"), and an icon for more information (e.g., "keep in mind"). Alternatively, a photo may be taken by activation of mechanical switches integrated with the user device 120.

Figure 12:
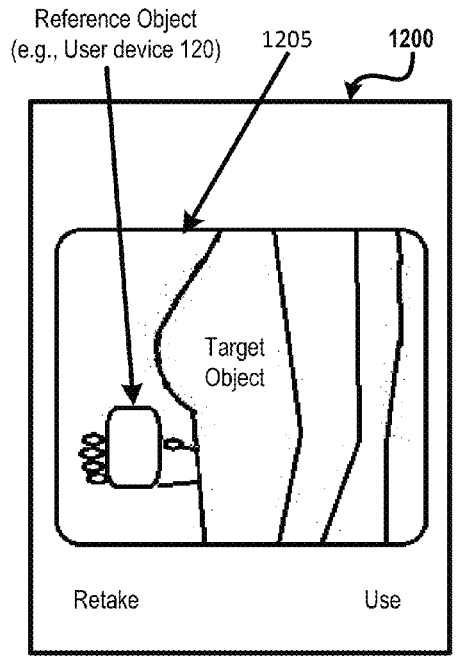

FIG. 12 depicts a user interface ("UI") 1200. The UI depicted in FIG. 12 may take various configurations and may perform various functions within the scope and spirit of the disclosure. For example, the disclosed UI 1200 may include an area 1205 within which a user of the user device 120 would position the target object and the reference object. As shown, the reference object is a phone with a built-in camera that captures a digital image of a side view of the target object and the reference object as reflected by a mirror.

Figure 13:
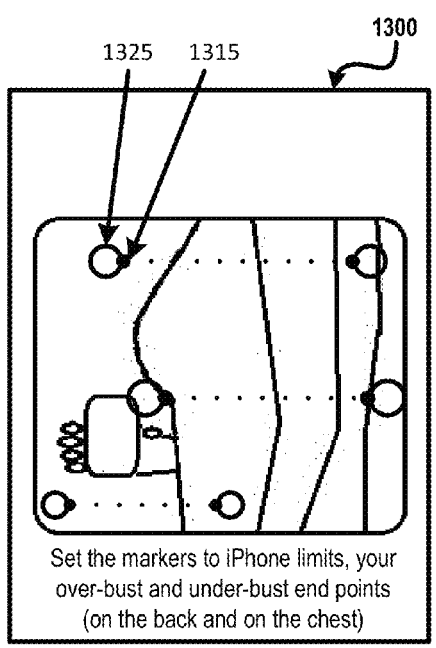

FIG. 13 depicts a user interface ("UI") 1300. The UI depicted in FIG. 13 may take various configurations and may perform various functions within the scope and spirit of the disclosure. For example, the disclosed UI 1300 may include a marker 1315 and a marker control 1325. The marker control 1325 may be activated by a user's finger when touched on the display. Once activated, the marker control 1325 may cause the marker 1315 to move around on the display based on corresponding movements of the user's finger.

FIG. 14 depicts a user interface ("UI") 1400. The UI depicted in FIG. 14 may take various configurations and may perform various functions within the scope and spirit of the disclosure. For example, the disclosed UI 1400 may include similar information as UI 1100, but for a different side of the target object.

Figure 15:
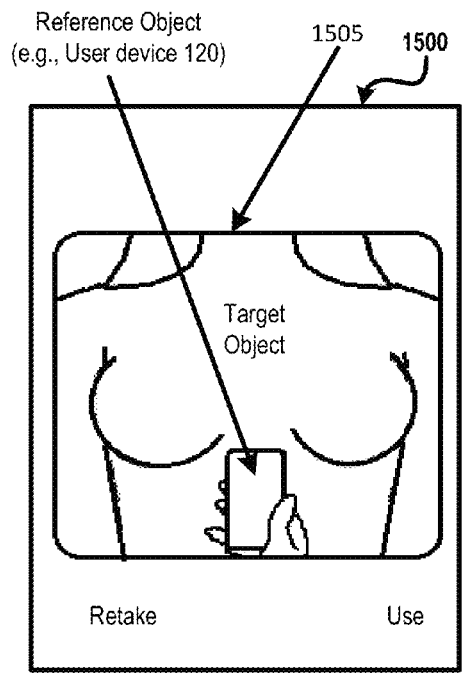

FIG. 15 depicts a user interface ("UI") 1500. The UI depicted in FIG. 15 may take various configurations and may perform various functions within the scope and spirit of the disclosure. For example, the disclosed UI 1500 may include similar information as UI 1200, but for a different side of the target object.

Figure 16:
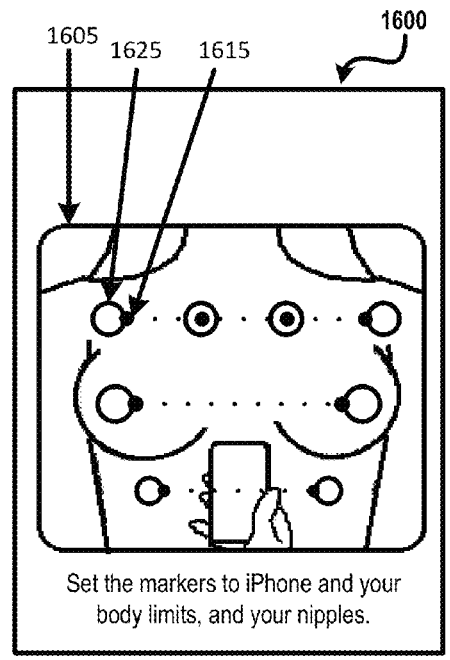

FIG. 16 depicts a user interface ("UI") 1600. The UI depicted in FIG. 16 may take various configurations and may perform various functions within the scope and spirit of the disclosure. For example, the disclosed UI 1600 may include similar information as UI 1300, but for a different side of the target object.

Figure 17:
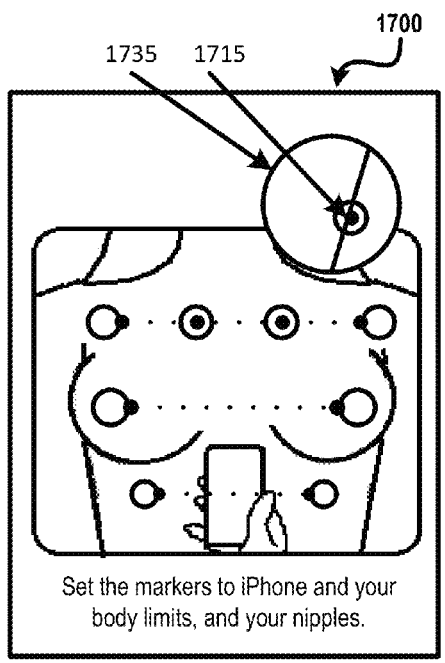

FIG. 17 depicts a user interface ("UI") 1700. The UI depicted in FIG. 17 may take various configurations and may perform various functions within the scope and spirit of the disclosure. For example, the disclosed UI 1700 may include a zoom area 1735 for showing a zoomed in part of the captured image. The zoom area 1735 may be used by the user to more-precisely place a marker at a desired location.

Figure 18:
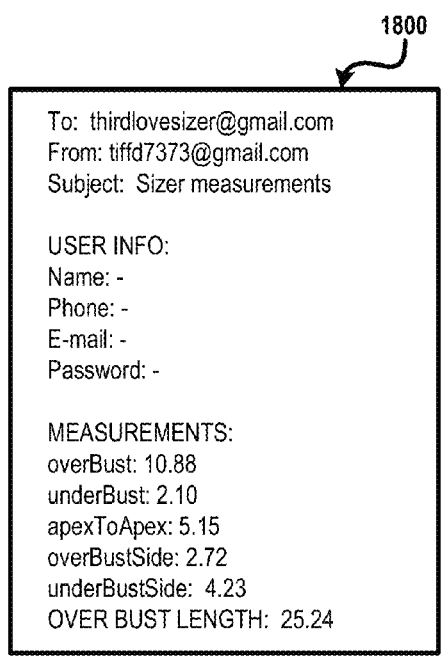

FIG. 18 depicts a UI that provides information regarding measurements.

In certain aspects of the disclosure, instructions are provided to a user to position a portion of the user's body and a phone with a built-in camera in front of a mirror so that a reflection of those objects may be captured by the built-in camera. Once the reflection is captured, additional instructions may be provided to a user to place markers at end points of certain parts of the user's body and the phone. Once the markers are placed, a distance between a set of markers for the body part and a distance between a set of markers for the phone are determined. Those distances are used to calculate an actual dimension associated with the user's body part where an actual dimension of the phone is known. One the actual dimension of the body part is calculated, that dimension may be converted to units of clothing size, and clothing suggestions may be provided to the user.

Other aspects of the disclosure may include collecting information relating to particular users. Such information may include user preferences (e.g., colors, patterns, types of clothing, etc.), past purchases, user clothing sizes, clothes the user current owns, and the user's profession, among other information. This information may be used by the user device 120 and/or the backend system 110 to make suggestions or otherwise select information for display to the user.

Example Methodologies

Functionality and operation disclosed herein may be embodied as one or more methods implemented by processor(s) at one or more many locations. Non-transitory processor-readable media embodying program instructions adapted to be executed to implement the method(s) are also contemplated.

By way of example, not by way of limitation, any number of methods may comprise: identifying a foreground region corresponding to an first object in the image; identifying a background region in the image; determining a segmentation area that includes pixels at or near a first boundary, wherein the first boundary separates the foreground region and the background region; identifying a first set of one or more characteristics that correspond to pixels of the foreground region; identifying a second set of one or more characteristics that correspond to pixels of the background region; and estimating the first boundary using the first and second sets of characteristics.

In accordance with some aspects, the first boundary is estimated by: identifying a first color of pixels in foreground region; identifying a second color of pixels in the background region; and estimating the first boundary based on the first color and the second color. In accordance with some aspects, the first boundary is estimated by: identifying differences between two or more neighboring pixels in the segmentation area; and using the identified differences to identify a first neighboring pixel on one side of the first boundary and a second neighboring pixel on another side of the first boundary.

In accordance with some aspects, the first boundary is estimated by: identifying one or more reference points at or near the first boundary; comparing pixels on one side of the reference point with pixels on an opposite side of the reference point; and estimating the first boundary based on the comparison.

In accordance with some aspects, the first boundary is estimated by: identifying a first row of pixels in the segmentation area; determining, for each pixel in the first row, a probability score corresponding to whether the pixel is at the first boundary; and determining that one of the pixels in the first row is at the first boundary based on that pixel's probability score relative to probability scores of the other pixels in the first row.

In accordance with some aspects, the first boundary is estimated by: identifying a first row of pixels in the segmentation area; determining, for each pixel in the first row, a first probability that the pixel is in the foreground region; determining, for each pixel in the first row, a second probability that the pixel is in the background region; and determining that the pixel is in only one of the foreground region and the background region based on a comparison of the first probability and the second probability.

In accordance with some aspects, the first boundary is estimated by: determining, for each pixel of a plurality of pixels in the first row, a sum of a first likelihood value corresponding to a first pixel that neighbors the pixel and a second likelihood value corresponding to a second pixel that neighbors the pixel; based on a comparison of the sums, identifying one of the plurality of pixels that is most-likely to be located at the first boundary.

In accordance with some aspects, the segmentation area includes is a predefined number of pixels to the left and to the right of a reference point identified by user input via a touch screen. In accordance with some aspects, the segmentation area is determined by identifying differences among neighboring pixels, and including different neighboring pixels in the segmentation area.

Methods may further or alternatively comprise: determining an expected boundary of the first object based on a first size of an expected shape that best fits the first boundary; identifying a first set of one or more segments of the estimated first boundary that align with the expected boundary; identifying a second set of one or more segments of the estimated first boundary that do not align with the expected boundary; and determining a refined estimate of the first boundary based on the first set of one or more segments that align with the expected boundary, but not based on the second set of one or more segments that do not align with the expected boundary. In accordance with some aspects, each segment of the first set aligns with the expected boundary when each segment of the first set is longer than each set of the second set. In accordance with some aspects, each segment of the first set aligns with the expected boundary when all pixels in each segment of the first set fall within a predefined range of pixel values.

Methods may further or alternatively comprise: identifying another foreground region corresponding to another object in the image; identifying another background region in the image; determining another segmentation area that includes pixels at or near a second boundary, wherein the second boundary separates the other foreground region and the other background region; identifying a third set of one or more characteristics that correspond to pixels of the other foreground region; identifying a fourth set of one or more characteristics that correspond to pixels of the other background region; estimating the second boundary using the third and fourth sets of characteristics; and determining a first dimension of the first object using the estimated first boundary, the estimated second boundary, and a known dimension of the second object.

Methods may further or alternatively comprise: determining a first distance between the estimated first boundary and another boundary that separates the foreground region and the background region; determining a second distance between two estimated boundaries corresponding to a second object in the image; wherein the first dimension of the first object is determined using the first distance, the second distance, and a known dimension of the second object. Methods may further or alternatively comprise: providing instructions to a user that instruct the user to capture the image using a mirror, to capture the image using a camera on a phone, to include a portion of the user's body in the image, and to include a portion of the phone in the image.

Systems may include one or more devices that carry out the methods, including user device(s), backend system(s), processor(s) on the user device(s), processing components of the server(s), other processing devices. It is contemplated that an output from one device may cause another device to perform a method even where the two devices are no co-located (e.g., a receiver in a network of transmitters and a server in another country). Additionally, one or more computers may programmed to carry out various methods, and instructions stored on one or more processor-readable media may be executed by a processor to perform various methods.

Other Aspects

Discussion relating to analysis along rows may equally apply to analysis along columns, diagonal lines and curved lines. Similarly, discussion relating to analysis along one axis (e.g., horizontal) may apply to other axes (e.g., vertical).

Computer Vision technology may be used to generate the contours of the human body to detect the best overbust and underbust measurements. Computer vision technology may include methods for acquiring, processing, analyzing, and understanding images from the real world in order to produce numerical or symbolic information, used to size contours of the human body. Such technology may include object recognition, motion tracking, relating sizes of two objects, and others.

In some embodiments, feature extraction may refer to a process of extracting prominent key points from the image, and normalization may refer to the process of converting a detected image with random size and orientation into a regular shape so that it can be used for calibration.

The various illustrative systems, methods, logical features, blocks, modules, components, circuits, and algorithm steps described herein may be implemented, performed, or otherwise controlled by suitable hardware known or later developed in the art, or by firmware or software executed by processor(s), or any such combination of hardware, software and firmware.

Systems may include one or more devices or means that implement the functionality (e.g., embodied as methods) described herein. For example, such devices or means may include processor(s) that, when executing instructions, perform any of the methods disclosed herein. Such instructions can be embodied in software, firmware and/or hardware. A processor (also referred to as a "processing device") may perform or otherwise carry out any of the operational steps, processing steps, computational steps, method steps, or other functionality disclosed herein, including analysis, manipulation, conversion or creation of data, or other operations on data. A processor may include a general purpose processor, a digital signal processor (DSP), an integrated circuit, a server, other programmable logic device, or any combination thereof. A processor may be a conventional processor, microprocessor, controller, microcontroller, or state machine. A processor can also refer to a chip or part of a chip (e.g., semiconductor chip). The term "processor" may refer to one, two or more processors of the same or different types. It is noted that a computer, computing device and user device, and the like, may refer to devices that include a processor, or may be equivalent to the processor itself.

A "memory" may accessible by a processor such that the processor can read information from and/or write information to the memory. Memory may be integral with or separate from the processor. Instructions may reside in such memory (e.g., RAM, flash, ROM, EPROM, EEPROM, registers, disk storage), or any other form of storage medium. Memory may include a non-transitory processor-readable medium having processor-readable program code (e.g., instructions) embodied therein that is adapted to be executed to implement any number of the various methods disclosed herein. Processor-readable media be any available storage media, including non-volatile media (e.g., optical, magnetic, semiconductor).

When embodied in software, the instructions can be downloaded to reside on and be operated from different platforms used by a variety of operating systems. When embodied in firmware, the instructions can be contained in a semiconductor chip or similar device.

Functionality disclosed herein may be programmed into any of a variety of circuitry that is suitable for such purpose as understood by one of skill in the art. For example, functionality may be embodied in processors having software-based circuit emulation, discrete logic, custom devices, neural logic, quantum devices, PLDs, FPGA, PAL, ASIC, MOSFET, CMOS, ECL, polymer technologies, mixed analog and digital, and hybrids thereof. Data, instructions, commands, information, signals, bits, symbols, and chips disclosed herein may be represented by voltages, currents, electromagnetic waves, magnetic fields or particles, optical fields or particles, or any combination thereof. Computing networks may be used to carry out functionality and may include hardware components (servers, monitors, I/O, network connection). Application programs may carry out aspects by receiving, converting, processing, storing, retrieving, transferring and/or exporting data, which may be stored in a hierarchical, network, relational, non-relational, object-oriented, or other data source.

"Data" and "information" may be used interchangeably. A data source which is depicted as a single storage device may be realized by multiple (e.g., distributed) storage devices. A data source may include one or more types of data sources, including hierarchical, network, relational, non-relational, object-oriented, or another type of data source. As used herein, computer-readable media includes all forms of computer-readable medium except, to the extent that such media is deemed to be non-statutory (e.g., transitory propagating signals). The disclosure is not intended to be limited to the aspects shown herein but is to be accorded the widest scope understood by a skilled artisan, including equivalent systems and methods.

Features in system and apparatus figures that are illustrated as rectangles may refer to hardware, firmware or software. It is noted that lines linking two such features may be illustrative of data transfer between those features. Such transfer may occur directly between those features or through intermediate features even if not illustrated. Where no line connects two features, transfer of data between those features is contemplated unless otherwise stated. Accordingly, the lines are provide to illustrate certain aspects, but should not limiting.

The words "comprise," "comprising," "include," "including" and the like are to be construed in an inclusive sense (i.e., not limited to) as opposed to an exclusive sense (i.e., consisting only of). Words using the singular or plural number also include the plural or singular number respectively. The words "or" or "and" cover both any of the items and all of the items in a list. "Some" and "any" and "at least one" refers to one or more. The term "device" may comprise one or more components (e.g., a processor, a memory, a receiver, a screen, and others).

The invention claimed is:

1. A method for estimating measurements of a first object by determining separation between two regions in an image, the method comprising:
   capturing the image using a camera of a user device, wherein the image includes the first object and a reference object;
   identifying, using one or more processors of the user device, a foreground region corresponding to the first object in the image;
   identifying, using the one or more processors, a background region in the image;
   determining, using the one or more processors, a segmentation area in the image that includes pixels of the foreground region and pixels of the background region at or near a first boundary that separates the foreground region and the background region, wherein the segmentation area in the image is determined by analyzing the image for differences among neighboring pixels and including neighboring pixels that are different in the segmentation area, or by identifying pixels near user-selected points on the image and including the identified pixels in the segmentation area;
   determining, using the one or more processors, an estimate of the first boundary by (1) identifying pixels in the segmentation area, (2) determining, for each identified pixel, a first probability that the pixel is in the foreground region, and a second probability that the pixel is in the background region, and (3) determining that the identified pixel is in only one of the foreground region or the background region based on a comparison of the first probability and the second probability;
   refining the estimate of the first boundary by removing noise to smooth the estimate of the first boundary; and
   determining a first dimension of the first object using the refined estimate of the first boundary, an estimated boundary of the reference object, and a known dimension of the reference object.

2. The method of claim 1, wherein the first boundary is estimated by:
   identifying a first color of pixels in foreground region;
   identifying a second color of pixels in the background region; and
   estimating the first boundary based on the first color and the second color.

3. The method of claim 1, wherein the first boundary is estimated by:
   identifying a first row of pixels in the segmentation area;
   determining, for each pixel in the first row, a probability score corresponding to whether the pixel is at the first boundary; and
   determining that one of the pixels in the first row is at the first boundary based on that pixel's probability score relative to probability scores of the other pixels in the first row.

4. The method of claim 3, wherein the first boundary is estimated by:
   determining, for each pixel of a plurality of pixels in the first row, a sum of a first likelihood value corresponding to a first pixel that neighbors the pixel and a second likelihood value corresponding to a second pixel that neighbors the pixel;
   based on a comparison of the sums, identifying one of the plurality of pixels that is most-likely to be located at the first boundary.

5. The method of claim 1, the method comprising:
   determining an expected boundary of the first object based on a first size of an expected shape that best fits the first boundary;
   identifying a first set of one or more segments of the estimated first boundary that align with the expected boundary;
   identifying a second set of one or more segments of the estimated first boundary that do not align with the expected boundary; and
   determining a refined estimate of the first boundary based on the first set of one or more segments that align with the expected boundary, but not based on the second set of one or more segments that do not align with the expected boundary.

6. The method of claim 5, wherein each segment of the first set aligns with the expected boundary when each segment of the first set is longer than each set of the second set.

7. The method of claim 5, wherein each segment of the first set aligns with the expected boundary when all pixels in each segment of the first set fall within a predefined range of pixel values.

8. The method of claim 1, the method comprising:
   identifying another foreground region corresponding to another object in the image;
   identifying another background region in the image;
   determining another segmentation area that includes pixels at or near a second boundary, wherein the second boundary separates the other foreground region and the other background region;
   identifying a third set of one or more characteristics that correspond to pixels of the other foreground region;
   identifying a fourth set of one or more characteristics that correspond to pixels of the other background region;
   estimating the second boundary using the third and fourth sets of characteristics; and
   determining a first dimension of the first object using the estimated first boundary, the estimated second boundary, and a known dimension of the second object.

9. The method of claim 1, the method comprising:
   determining a first distance between the estimated first boundary and another boundary that separates the foreground region and the background region;

determining a second distance between two estimated boundaries corresponding to a second object in the image;

wherein the first dimension of the first object is determined using the first distance, the second distance, and a known dimension of the second object.

10. The method of claim 1, the method comprising:
providing instructions to a user that instruct the user to capture the image using a mirror, to capture the image using a camera on a phone, to include a portion of the user's body in the image, and to include a portion of the phone in the image.

11. The method of claim 1, wherein:
the first probability that the pixel is in the foreground region is determined by computing a color-normalized foreground region histogram using pixels of the foreground region, determining a color value of the pixel, comparing the color value of the pixel to color values of the foreground region histogram, and computing the probability that the pixel belongs to the foreground region; and
the second probability that the pixel is in the background region is determined by computing a color-normalized background region histogram using pixels of the background region, comparing the color value of the pixel to color values of the background region histogram, and computing the probability that the pixel belongs to the background region.

12. The method of claim 11, wherein each of the foreground region histogram and the background region histogram includes a plurality of bins, and each bin of each plurality of bins represents a range of color values, and wherein each bin of each plurality of bins is used to quantize a range of color values to a single representative color value for the range of color values represented by that bin.

13. The method of claim 11, wherein each of the foreground region histogram and the background region histogram includes a plurality of bins, and each bin of each plurality of bins represents a range of color values, and wherein the method further comprises:
applying a weighting window to each of the plurality of bins included in the foreground region histogram; and
applying the weighting window to each of the plurality of bins included in the background region histogram,
wherein the weighting window assigns more weight to color values that are centered in each bin, and the weighting window assigns less weight to color values that are near borders of each bin.

14. The method of claim 11, wherein each of the foreground region histogram and the background region histogram includes a plurality of bins, and each bin of each plurality of bins represents a range of color values, and wherein the method further comprises:
applying a weighting window to each of the plurality of bins included in the foreground region histogram; and
applying the weighting window to each of the plurality of bins included in the background region histogram,
wherein the weighting window assigns a weight to each color value within each bin, and the weight is directly proportional to the distance between that color value from the center color value of that bin.

15. The method of claim 1, wherein the segmentation area in the image is determined by analyzing the image for differences among neighboring pixels and including neighboring pixels that are different in the segmentation area.

16. The method of claim 1, wherein the segmentation area in the image is determined by identifying pixels near user-selected points on the image and including the identified pixels in the segmentation area.

17. The method of claim 1, wherein the estimate of the first boundary is refined using a spline method of refinement or a Viterbi method of refinement.

18. The method of claim 1, the method comprising:
identifying a second foreground region corresponding to the reference object in the image;
identifying a second background region in the image;
determining a second segmentation area in the image that includes pixels of the second foreground region and pixels of the second background region at or near a second boundary that separates the second foreground region and the second background region,
determining the estimated boundary of the reference object by (1) identifying pixels in the second segmentation area, (2) determining, for each identified pixel in the second segmentation area, a first probability that the pixel is in the second foreground region, and a second probability that the pixel is in the second background region, and (3) determining that the identified pixel is in only one of the second foreground region or the second background region based on a comparison of the first probability and the second probability.

19. The method of claim 1, the method comprising:
determining a first distance between the refined estimate of the first boundary and a refined estimate of another boundary that separates the foreground region and the background region;
determining a second distance between two estimated boundaries of the reference object,
wherein the first dimension of the first object is determined using the first distance, the second distance, and a known dimension of the second object.

20. A non-transitory processor-readable medium embodying program instructions adapted to be executed to implement a method for estimating measurements of a first object by determining separation between two regions in an image, the method comprising:
capturing the image using a camera of a user device, wherein the image includes the first object and a reference object;
identifying, using one or more processors of the user device, a foreground region corresponding to the first object in the image;
identifying, using the one or more processors, a background region in the image;
determining, using the one or more processors, a segmentation area in the image that includes pixels of the foreground region and pixels of the background region at or near a first boundary that separates the foreground region and the background region, wherein the segmentation area in the image is determined by analyzing the image for differences among neighboring pixels and including neighboring pixels that are different in the segmentation area, or by identifying pixels near user-selected points on the image and including the identified pixels in the segmentation area;
determining, using the one or more processors, an estimate of the first boundary by (1) identifying pixels in the segmentation area, (2) determining, for each identified pixel, a first probability that the pixel is in the foreground region, and a second probability that the pixel is in the background region, and (3) determining that the identified pixel is in only one of the foreground region or the background region based on a comparison of the first probability and the second probability;

refining the estimate of the first boundary by removing noise to smooth the estimate of the first boundary; and determining a first dimension of the first object using the refined estimate of the first boundary, an estimated boundary of the reference object, and a known dimension of the reference object.

21. The non-transitory processor-readable medium of claim 20, wherein:

the first probability that the pixel is in the foreground region is determined by computing a color-normalized foreground region histogram using pixels of the foreground region, determining a color value of the pixel, comparing the color value of the pixel to color values of the foreground region histogram, and computing the probability that the pixel belongs to the foreground region; and the second probability that the pixel is in the background region is determined by computing a color-normalized background region histogram using pixels of the background region, comparing the color value of the pixel to color values of the background region histogram, and computing the probability that the pixel belongs to the background region.

22. The non-transitory processor-readable medium of claim 21, wherein each of the foreground region histogram and the background region histogram includes a plurality of bins, and each bin of each plurality of bins represents a range of color values, and wherein each bin of each plurality of bins is used to quantize a range of color values to a single representative color value for the range of color values represented by that bin.

23. The non-transitory processor-readable medium of claim 21, wherein each of the foreground region histogram and the background region histogram includes a plurality of bins, and each bin of each plurality of bins represents a range of color values, and wherein the method further comprises:

applying a weighting window to each of the plurality of bins included in the foreground region histogram; and applying the weighting window to each of the plurality of bins included in the background region histogram, wherein (1) the weighting window assigns more weight to color values that are centered in each bin, and the weighting window assigns less weight to color values that are near borders of each bin, or (2) the weighting window assigns a weight to each color value within each bin, and the weight is directly proportional to the distance between that color value from the center color value of that bin.

24. The non-transitory processor-readable medium of claim 20, wherein the segmentation area in the image is determined by analyzing the image for differences among neighboring pixels and including neighboring pixels that are different in the segmentation area.

25. The non-transitory processor-readable medium of claim 20, wherein the segmentation area in the image is determined by identifying pixels near user-selected points on the image and including the identified pixels in the segmentation area.

26. The non-transitory processor-readable medium of claim 20, wherein the estimate of the first boundary is refined using a spline method of refinement or a Viterbi method of refinement.

27. The non-transitory processor-readable medium of claim 20, the method comprising:

identifying a second foreground region corresponding to the reference object in the image;

identifying a second background region in the image;

determining a second segmentation area in the image that includes pixels of the second foreground region and pixels of the second background region at or near a second boundary that separates the second foreground region and the second background region, determining the estimated boundary of the reference object by (1) identifying pixels in the second segmentation area, (2) determining, for each identified pixel in the second segmentation area, a first probability that the pixel is in the second foreground region, and a second probability that the pixel is in the second background region, and (3) determining that the identified pixel is in only one of the second foreground region or the second background region based on a comparison of the first probability and the second probability.

28. The non-transitory processor-readable medium of claim 20, the method comprising:

determining a first distance between the refined estimate of the first boundary and a refined estimate of another boundary that separates the foreground region and the background region;

determining a second distance between two estimated boundaries of the reference object, wherein the first dimension of the first object is determined using the first distance, the second distance, and a known dimension of the second object.

29. A system for estimating measurements of a first object by determining separation between two regions in an image, the system comprising:

a camera that captures an image; and one or more processors that:

identify, using one or more processors of the user device, a foreground region corresponding to the first object in the image;

identify, using the one or more processors, a background region in the image;

determine, using the one or more processors, a segmentation area in the image that includes pixels of the foreground region and pixels of the background region at or near a first boundary that separates the foreground region and the background region, wherein the segmentation area in the image is determined by analyzing the image for differences among neighboring pixels and including neighboring pixels that are different in the segmentation area, or by identifying pixels near user-selected points on the image and including the identified pixels in the segmentation area;

determine, using the one or more processors, an estimate of the first boundary by (1) identifying pixels in the segmentation area, (2) determining, for each identified pixel, a first probability that the pixel is in the foreground region, and a second probability that the pixel is in the background region, and (3) determining that the identified pixel is in only one of the foreground region or the background region based on a comparison of the first probability and the second probability;

refine the estimate of the first boundary by removing noise to smooth the estimate of the first boundary; and determine a first dimension of the first object using the refined estimate of the first boundary, an estimated boundary of the reference object, and a known dimension of the reference object.

* * * * *